US012673695B1

(12) United States Patent
  Eldar et al.

(10) Patent No.: US 12,673,695 B1
(45) Date of Patent: Jul. 7, 2026

(54) VEHICLE TRAJECTORY ESTIMATION FOR THE GENERATION OF GROUND TRUTH DATA

(71) Applicant: Mobileye Vision Technologies Ltd., Jerusalem (IL)

(72) Inventors: Avigdor Eldar, Modiin (IL); Ofer Springer, Jerusalem (IL); David Neuhof, Jerusalem (IL); Uri Rokni, Modiin (IL); Iddo Hanniel, Modiin (IL); Gideon Wachtel, Jerusalem (IL); Yotam Stern, Jerusalem (IL); Amittai Cohen-Zemach, Jerusalem (IL); Yishai Lavi, Ness Ziona (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 262 days.

(21) Appl. No.: 18/298,427

(22) Filed: Apr. 11, 2023

Related U.S. Application Data

(60) Provisional application No. 63/330,477, filed on Apr. 13, 2022.

(51) Int. Cl.
  *B60W 60/00* (2020.01)
  *B60W 40/02* (2006.01)
  *G06T 7/20* (2017.01)

(52) U.S. Cl.
  CPC ........ *B60W 60/0015* (2020.02); *B60W 40/02* (2013.01); *G06T 7/20* (2013.01);
  (Continued)

(58) Field of Classification Search
  CPC ............. B60W 60/0015; B60W 40/02; B60W 2554/80; G06T 7/20; G06T 2207/10028; G06T 2207/20081; G06T 2207/30241
  See application file for complete search history.

(56) References Cited

U.S. PATENT DOCUMENTS 9,043,069 B1 * 5/2015 Ferguson ................ G06T 7/215
                                                                  701/23
2017/0085864 A1 * 3/2017 Yang ........................ G06T 7/521
  (Continued)

OTHER PUBLICATIONS

F. Dellaert, "Lie Groups for Beginners", https://github.com/borglab/gtsam/blob/develop/doc/LieGroups.pdf, 21 pgs., Feb. 7, 2021.
  (Continued)

*Primary Examiner* — Mohamad O El Sayah
(74) *Attorney, Agent, or Firm* — Banner & Witcoff, Ltd.

(57) ABSTRACT

Techniques are disclosed to enable the generation of ground truth datasets that identify a continuous time movement trajectory of dynamic objects such as non-stationary vehicles. The techniques as described herein may utilize iterative closest point (ICP) processes to compute a rigid-body transform that describes a 3D correspondence between different pairs of temporal point cloud data sample sets at various discrete time periods that are identified with an object along a movement trajectory. From these rigid-body transforms at each of the discrete time periods, a pose graph optimization may be performed to compute the continuous time movement trajectory. The ground truth datasets may be used to enable training of machine learning models, which may be used by a vehicle computing system when navigating a driving environment.

22 Claims, 11 Drawing Sheets

(52) U.S. Cl.
CPC .................... *B60W 2554/80* (2020.02); *G06T 2207/10028* (2013.01); *G06T 2207/20081* (2013.01); *G06T 2207/30241* (2013.01); *G06T 2207/30261* (2013.01)

(56) References Cited

U.S. PATENT DOCUMENTS

| | | | |
|---|---|---|---|
| 2020/0005489 A1* | 1/2020 | Kroeger .................... | G06T 7/85 |
| 2020/0174490 A1* | 6/2020 | Ogale .................... | G06N 3/045 |
| 2021/0090242 A1* | 3/2021 | Hever .................... | G06T 17/20 |
| 2021/0221398 A1* | 7/2021 | Korobkin .............. | G06V 20/56 |
| 2022/0020158 A1* | 1/2022 | Ning ........................ | G06T 7/246 |
| 2022/0297688 A1* | 9/2022 | Park ...................... | G01S 15/931 |
| 2023/0100776 A1* | 3/2023 | Shen ..................... | G06T 7/0002 |
| | | | 382/103 |
| 2023/0289983 A1* | 9/2023 | Chumerin .............. | G06T 7/248 |
| 2023/0298361 A1* | 9/2023 | Yang ................... | G06V 20/588 |
| | | | 382/104 |
| 2024/0185437 A1* | 6/2024 | Kannaiah ............ | G06V 10/242 |

OTHER PUBLICATIONS

F. Dellaert, "Derivatives and Differentials", https://github.com/borglab/gtsam/blob/develop/doc/math.pdf, 31 pgs., Jan. 25, 2022.
GTSAM Blog, https://gtsam.org/blog/, 2 pgs., Jun. 24, 2021.

* cited by examiner

Input

Output

Time

Step 1:
ICP: Estimate RTs between time adjacent PCLs

Step 2:
Chain RTs

Step 3:
RTs interpolation: estimate RT to any point in time $$RT_{0,4} = RT_{0,1} \cdot RT_{1,2} \cdots RT_{3,4}$$

900

VEHICLE TRAJECTORY ESTIMATION FOR THE GENERATION OF GROUND TRUTH DATA

CROSS-REFERENCE TO RELATED APPLICATIONS

This application claims priority to provisional application no. 63,330,477, filed on Apr. 13, 2022, the contents of which are incorporated herein by reference in their entirety.

TECHNICAL FIELD

This disclosure generally relates to the implementation of object trajectory estimation and, in particular, to the use of improved object trajectory estimation techniques to generate ground truth data that may be used to perform machine learning training processes to enable the prediction of object trajectories.

BACKGROUND

Ground truth in the context of machine learning refers to a particular "reality" that is the goal of what is to be modeled with a machine learning algorithm. Thus, ground truth data may alternatively be referred to as a target for training or validating a machine learning based model with a labeled dataset. For example, a model that is trained to perform object classification may predict, during the inference stage, a label, which can then be compared with an available ground truth label to validate the trained model and to ensure that the model accurately classifies objects.

Thus, more substantial annotated datasets enable a ground truth for machine learning and deep learning algorithms to learn better patterns by increasing data variety. However, developing such ground truth datasets is an arduous process, and often requires significant tasks be performed such as model design, data labeling, classifier design, and training/testing. For example, conventional ground truth labels for datasets may be annotated manually by a group of annotators and then later compared using different techniques to set target labels for the dataset. Thus, the current techniques by which the ground truth datasets are generated have significant drawbacks and have been inadequate.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIGS. 3A-3C illustrate an example image frame and accompanying input data used to perform object trajectory estimation, in accordance with one or more aspects of the present disclosure;

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
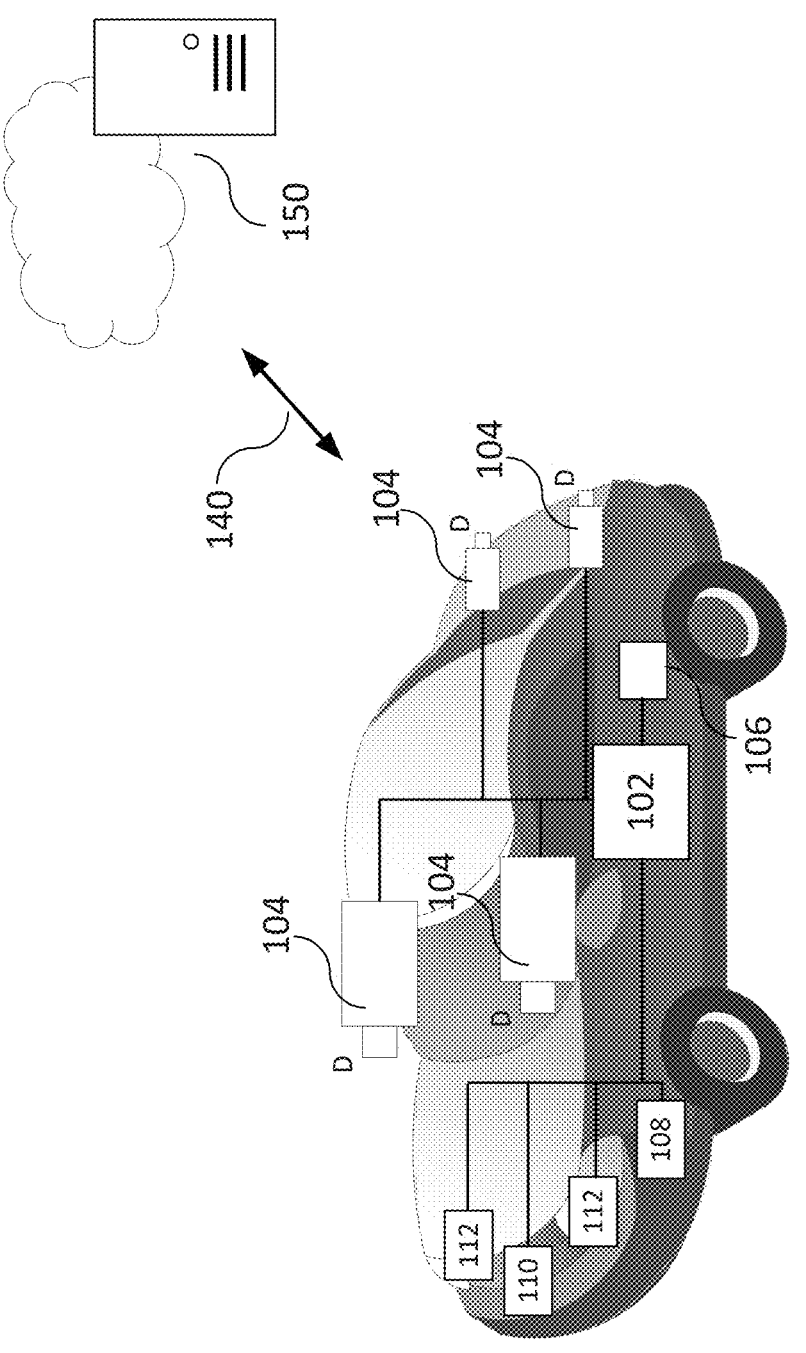
FIG. 1 illustrates an example vehicle in accordance with one or more aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

I. Introduction to the Use of Ground Truth Data for Object Trajectory Estimation Ground truth datasets are utilized in the field of autonomous and/or semi-autonomous driving for training machine learning models to estimate the trajectory of surrounding vehicles over time. For example, a deployed trained machine learning model may be implemented by a vehicle's onboard vehicle computing system to detect and classify, using sensor data provided via an onboard sensor suite, objects such as vehicles while the "ego" vehicle navigates a driving environment. The ego vehicle may further utilize the sensor data and the trained model to then predict a vehicle trajectory for one or more of the detected vehicles. From the various precited trajectories, the ego vehicle may, via its onboard computing systems, perform various vehicle-based functions such as steering the vehicle, adjusting the speed of the vehicle, applying braking, etc., to avoid a potential collision. Thus, the accuracy of the trained model is a safety-related concern, as it directly influences vehicle and occupant safety as a result of the decisions made based upon the vehicle trajectory predictions. The use of a large and reliable ground truth dataset, in turn, allows for better training of these machine learning models, and thus the embodiments described herein improve safety by improving the manner in which machine learning models may be trained.

The ground truth datasets may be generated for this purpose using a ground truth dataset generation process, which may utilize sensor data that has been synchronized with various image frames that are acquired over a period of time. The image frames may be obtained via other vehicles, infrastructure, etc., that are navigating or otherwise positioned in a driving environment as part of a testing or data collection process. The image frames may thus be identified with video data that has been acquired over a driving environment that is similar to that of the vehicle in which the trained model is to be deployed. For example, the image frames may correspond to video feeds in a specific driving environment and/or region, and be synchronized with sensor data that is acquired over the same time period such as LIDAR, VIDAR, inertial measurement units (IMUs), etc.

For example, each one of the image frames may comprise any suitable number of pixels, which need to be labeled with a specific object classification and depth value to represent part of the ground truth dataset. Different types of sensor data, as well as other processes, may be applied to the image frames to generate the ground truth dataset, the sensor types and processes being a function of the type of object for which the depth data is to be identified. For example, Visual Detection and Ranging (VIDAR) or Light Detection and Ranging (LIDAR) sensor data may be used to identify the depth value (i.e. distance or range) for each pixel in an image frame that is identified with an object. As another example, a known technique such as Structure from motion (SfM) may be utilized, which is a process of estimating the 3D structure of a scene from 2D images, and which may be used in conjunction with local motion signals derived via the IMU sensors of the ego vehicle (i.e. the vehicle recording the image frames). The SfM technique may utilize a separate artificial intelligence system, e.g. a trained machine learning model for this specific purpose, to provide the range data for pixels in an image frame.

However, because sensors such as LIDAR in particular are known for providing incomplete (i.e. sparse) data with respect to the acquired image frames, the conventional means by which image frame pixels are labeled typically includes aggregating LIDAR data over time. In other words, the LIDAR data used to provide the depth data per pixel is aggregated from LIDAR sensor data acquired by the ego vehicle along a portion of a drive (e.g. 40-80-meters). This aggregated LIDAR data is then used in conjunction with the ego vehicle's IMU sensor data, e.g. via a SfM technique, to identify and transfer 3D points objects over time (i.e. over multiple image frames). Such conventional techniques may utilize other algorithms such as optical flow and/or feature-matching (e.g. superGlue) between temporally-successive image frames to derive data regarding the motion of objects with respect to the ego vehicle.

But such conventional techniques are limited to static objects, and these same techniques do not extend to dynamic objects within the image frames such as pedestrians or non-stationary vehicles. Thus, such dynamic objects are typically filtered out using trained models that apply segmentation masks. In light of these limitations, data representing the trajectory of dynamic objects, such as non-stationary vehicles for instance, needs to be acquired using an alternate means. The embodiments as further described herein are primarily directed to such an alternate means, i.e. to determining a vehicle trajectory estimation for dynamic vehicles present in an acquired dataset to generate a ground truth dataset that contains this information.

II. An Example Vehicle Architecture and Operation

FIG. 1 shows a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driver assistance control system, including AV and/or advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementation within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
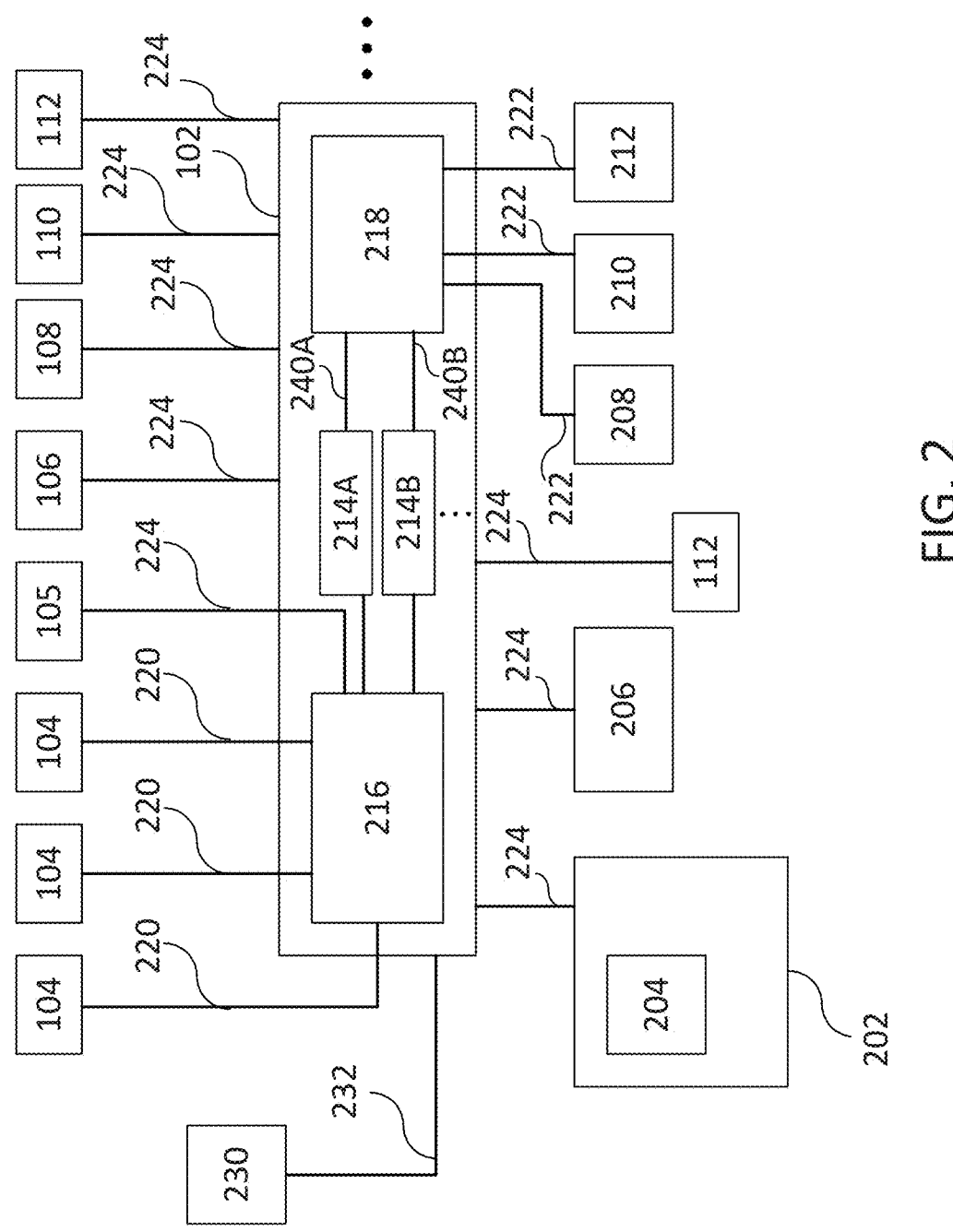
FIG. 2 illustrates various example electronic components of a safety system of a vehicle, in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more vehicle cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212. Additionally or alternatively, the one or more user interfaces 206 may be identified with other components in communication with the safety system 200, such as one or more components of an ADAS unit, an AV system, etc., as further discussed herein.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices via one or more wireless links 140. This may include, for instance, communications with a remote server or other suitable computing system 150 as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the remote computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors 102 and/or the safety system 200 may form the entirety of or a portion of an advanced driver-assistance system (ADAS).

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors can thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102. e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for case of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example. Of course, the application processors 214A, 214B may perform other functions in addition to or as an alternative to control-based functions, such as facilitating the various vehicle-based functions discussed herein, providing ADAS alerts, providing warnings regarding possible collisions, etc.

The one or more processors 102 may additionally be implemented to communicate with any other suitable components of the vehicle 100 to determine a state of the vehicle while driving or at any other suitable time, which may comprise an analysis of data representative of a vehicle status. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with the aspects described in further detail below. As one example, the one or more processors 102, which may include one or more of the processors 214A, 214B, 216, 218, etc., may execute the computer-readable instructions to perform one or more functions as discussed herein, e.g. the training of and/or use of a deployed trained machine learning model to perform object trajectory estimation and to determine a course of action (e.g. a vehicle-based function) to perform in response to these predictions.

A relevant memory accessed by the one or more processors 214A, 214B, 216, 218 (e.g. the one or more memories 202) may also store one or more databases and image processing software, as well as a trained system or machine learning model (such as those discussed herein, which may be trained via the generated ground truth datasets, or other suitable trained models and/or trained systems), such as one or more neural networks, or deep neural networks, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for case of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions.

In some aspects, the safety system 200 may further include components such as a speed sensor 108 (e.g. a speedometer) for measuring a speed of the vehicle 100. The safety system 200 may also include one or more inertial measurement unit (IMU) sensors such as e.g. accelerometers, magnetometers, and/or gyroscopes (either single axis or multiaxis) for measuring accelerations of the vehicle 100 along one or more axes, and additionally or alternatively one or more gyro sensors, which may be implemented for instance to calculate the vehicle's ego-motion as discussed herein, alone or in combination with other suitable vehicle sensors. These IMU sensors may, for example, be part of the position sensors 105 as discussed herein. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (e.g., one or more links 224) may couple the speed sensor 108, the one or more radar sensors 110, and the one or more LIDAR sensors 112 to at least one of the one or more processors 102.

III. Autonomous Vehicle (AV) Map Data and Road Experience Management (REM)

Data referred to as REM map data (or alternatively as roadbook map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. It is noted that although referred to herein as "AV map data," the data may be implemented in any suitable vehicle platform, which may include vehicles having any suitable level of automation (e.g. levels 0-5), as noted above.

Regardless of where the AV map data is stored and/or accessed, the AV map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the AV map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, and as noted above, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks. Because the landmarks are identified with predetermined geographic coordinates, the vehicle 100 may determine its position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the AV map data is generally constructed as part of a series of steps, which may involve any suitable number of vehicles that opt into the data collection process. For instance, Road Segment Data (RSD) is collected as part of a harvesting step. As each vehicle collects data, the data is classified into tagged data points, which are then transmitted to the cloud or to another suitable external location. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the AV map data. This information is then compiled into a Roadbook Map, which constitutes a bank of driving paths, semantic road information such as features and objects, and aggregated driving behavior.

A map database 204, which may be stored as part of the one or more memories 202 or accessed via the computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the AV map data, which includes data relating to the position, in a reference coordinate system, of various landmarks such as objects and other items of information, including roads, water features, geographic features, businesses, points of interest, restaurants, gas stations, etc.

The map database 204 may thus store, as part of the AV map data, not only the locations of such landmarks, but also descriptors relating to those landmarks, including, for example, names associated with any of the stored features, and may also store information relating to details of the items such as a precise position and orientation of items. In some cases, the AV map data may store a sparse data model including polynomial representations of certain road features (e.g., lane markings) or target trajectories for the vehicle 100. The AV map data may also include stored representations of various recognized landmarks that may be provided to determine or update a known position of the vehicle 100 with respect to a target trajectory. The landmark representations may include data fields such as landmark type, landmark location, etc., among other potential identifiers. The AV map data may also include non-semantic features including point clouds of certain objects or features in the environment, and feature point and descriptors.

The map database 204 may be augmented with data in addition to the AV map data, and/or the map database 204 and/or the AV map data may reside partially or entirely as part of the remote computing system 150. As discussed herein, the location of known landmarks and map database information, which may be stored in the map database 204 and/or the remote computing system 150, may form what is referred to herein as "AV map data," "REM map data" or "Roadbook Map data." The one or more processors 102 may process sensory information (such as images, radar signals, depth information from LIDAR or stereo processing of two or more images) of the environment of the vehicle 100 together with position information, such as GPS coordinates, the vehicle's ego-motion, etc., to determine a current location, position, and/or orientation of the vehicle 100 relative to the known landmarks by using information contained in the AV map. The determination of the vehicle's location may thus be refined in this manner. Certain aspects of this technology may additionally or alternatively be included in a localization technology such as a mapping and routing model.

IV. A Safety Driving Model

Furthermore, the safety system 200 may implement a safety driving model or SDM (also referred to as a "driving policy model," "driving policy," or simply as a "driving model"), e.g., which may be utilized and/or executed as part of the ADAS system as discussed herein. By way of example, the safety system 200 may include (e.g. as part of the driving policy) a computer implementation of a formal model such as a safety driving model. A safety driving model may include an implementation of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly navigate and/or control the driving operation of the vehicle 100, such navigation including driving the vehicle 100 or other suitable vehicle-based operations as further discussed herein. This navigation may optionally include adjusting one or more SDM parameters, which may occur in response to the detection of any suitable type of feedback that is obtained via image processing, sensor measurements, the prediction of an object trajectory and/or the prediction of an object's position using the trajectory information, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may be used to identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. Thus, the vehicle 100 may utilize the tasks performed via trained model(s) to perform various navigation-related operations (which may include the vehicle-based functions as discussed herein) within the framework of the driving policy model.

The navigation-related operations may be performed, for instance, by generating the environmental model and using the driving policy model in conjunction with the environmental model to determine an action to be carried out by the vehicle. That is, the driving policy model may be applied based upon the environmental model to determine one or more actions (e.g. navigation-related operations) to be carried out by the vehicle. The SDM can be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular scenario. The navigation-related operations may thus cause the vehicle 100 to execute a specific action based upon the environmental model to comply with the SDM parameters defined by the SDM model as discussed herein. For instance, navigation-related operations may include vehicle-based functions as discussed herein, such as steering the vehicle 100, changing an acceleration and/or velocity of the vehicle 100, executing predetermined trajectory maneuvers, etc. In other words, an environmental model may be generated, and the applicable driving policy model may then be applied together with the environmental model to determine a navigation-related operation to be performed by the vehicle.

V. Example Processes for Computing an Object Trajectory

Figure 3C:
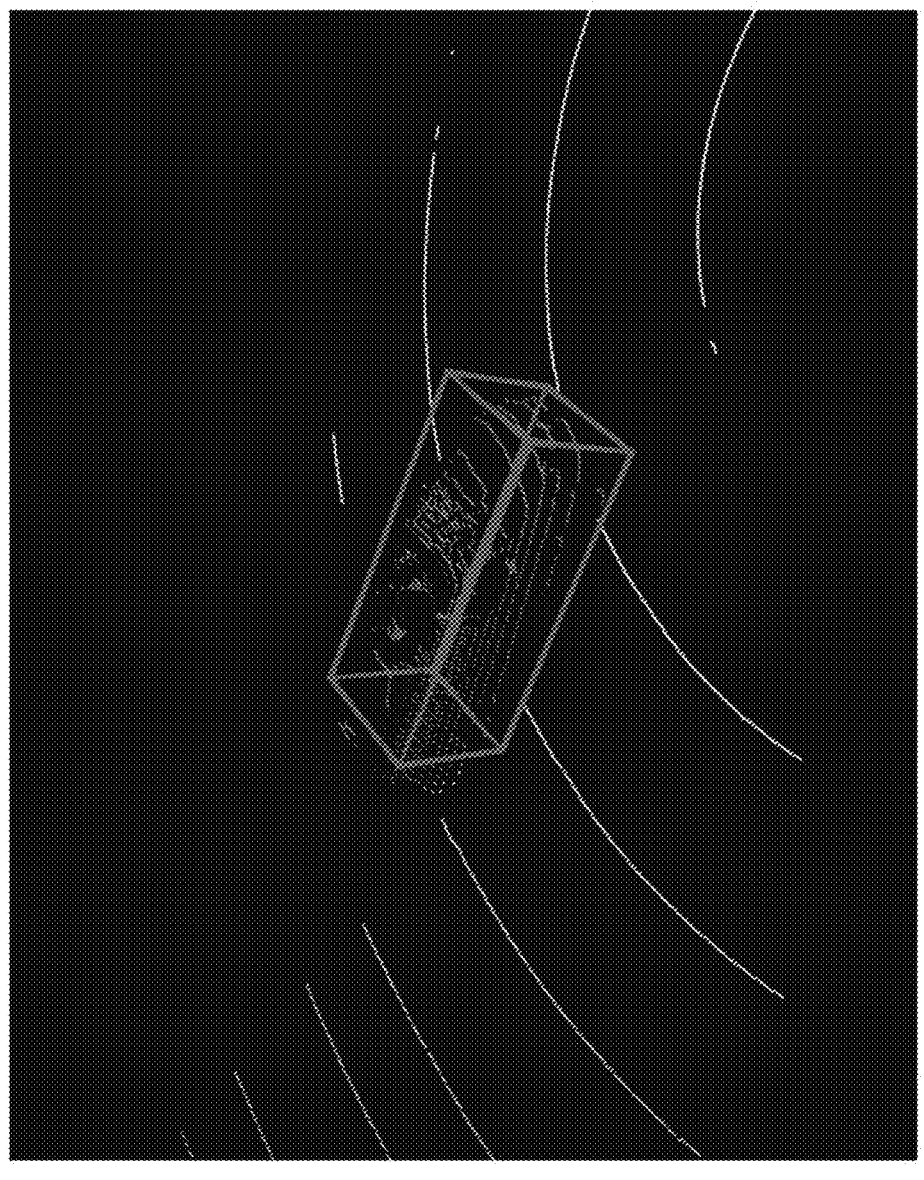

FIGS. 3A-3C illustrate an example image frame and accompanying input data used to perform object trajectory estimation, in accordance with one or more aspects of the present disclosure. The object trajectory estimation techniques as further discussed herein may be implemented in accordance with any suitable computing device, processing circuitry, and/or application. For example, the object trajectory estimation may be performed by a computing device having one or more processor components, a memory, etc., which may be configured to execute machine-readable instructions to perform the various computations identified with the object trajectory estimation. An example of such a computing device is shown and discussed further below with respect to FIG. 10. As another example, the object trajectory estimation may be performed by any suitable components (e.g. the one or more processors 102) of the safety system 200 as discussed above with respect to FIGS. 1 and 2 independently and/or via the execution of machine-readable instructions that are accessed via a suitable memory (e.g. the one or more memories 202).

In any event, the object trajectory estimation techniques performed in accordance with the embodiments discussed herein may utilize any suitable number of image frames that are representative of an environment for which the ground truth data and machine learning training process is applicable. For example, ground truth data may be generated as discussed herein to perform training of a machine learning model that estimates a vehicle trajectory from acquired sensor data while navigating a driving environment. In such a case, the image frames may be representative of a suitable driving environment that is expected to be encountered by the vehicle on which the trained machine learning model is deployed. Although described herein in the context of such applications, the embodiments described herein are not limited to the estimation of vehicle trajectories in a driving context, and may include the estimation of a trajectory of any suitable object that is moving within any suitable type of environment. For instance, the embodiments discussed herein may be applied to estimate the trajectory of pedestrians, cyclists, autonomous mobile robots (AMRs), projectiles, etc.

To do so, the object trajectory estimation techniques as described herein may utilize the raw lidar data (or other suitable data indicating depth) provided with the image frames, which provides data for the entire environment in which an ego-vehicle (the vehicle collecting the data) is navigating. This may include, for instance, roads, buildings, pedestrians, vehicles, etc., each being identified with a respective set of temporal point cloud data samples that represent a set of 3D points of that respective object in 3D space. Thus, the image frames may contain or otherwise reference data that enables the computation of temporal point clouds for each object within each image frame for which a movement trajectory is to be computed.

For example, the image frames may be synchronized with other data sources such as LIDAR, RADAR, etc., such that the image frame contains a set of pixels, with each pixel being identified with coordinates in three-dimensional (3D) space and a classification label. The 3D coordinates may thus include a depth value that may be obtained via any suitable techniques that leverage any suitable type of sensor data used when the image frames were acquired, as well as an indication of a particular type of object with which the pixel is identified.

As an illustrative example, FIG. 3A shows five different classified objects, some being static (i.e. non-moving objects) whereas others are moving (i.e. "car"). The object trajectory estimation techniques as described herein may thus receive, as an input, a set of temporal point cloud data samples, with each one of the set of temporal point cloud data samples comprising a set of three-dimensional (3D) coordinates that represent an object in 3D space at a respective discrete time period within a movement trajectory of the object. For example, a "discrete" time period in this context may the position and orientation of an object within an image frame at a time identified with that image frame.

Additionally, the object trajectory estimation techniques as described herein may receive a further input comprising a 3D bounding box, which is identified with each classified object in each image frame. A 3D bounding box, as is generally known, identifies the orientation of each object, with some illustrative examples being shown in FIG. 3B. The 3D bounding box data may be provided via a separate process and/or algorithm. Alternatively, the computation of the 3D bounding box data may be performed as part of the object trajectory estimation techniques as described herein. In any event, the 3D bounding boxes allow the object trajectory estimation techniques as described herein to take only the temporal point cloud data samples (e.g. lidar samples) that "belong" to a given vehicle of interest at a given point in time. Moreover, the bounding box data enables the object trajectory estimation techniques as described herein to separate or otherwise distinguish the temporal point cloud data samples between two or more moving vehicles over time. In other words, the 3D bounding-boxes provide information that links each set of temporal point cloud data samples to a specific object in the image frame. The 3D bounding box data thus allows for an association between each physical object for which a movement trajectory is to be determined and a respective point-cloud, i.e. a specific set of temporal point cloud data samples for that object.

Thus, the input data may comprise multiple sets of temporal point cloud data samples for a given object, which together represent the discrete time periods identified with a period of time over which a movement trajectory of that object is to be computed. An illustrative example of temporal point cloud data sample set and a corresponding 3D bounding box is shown in FIG. 3C for one discrete time period (e.g. a "snapshot" of the object within the movement trajectory that is to be computed). From the sets of temporal point cloud data samples and bounding boxes, the object trajectory estimation techniques as described herein may generate an output that represents a continuous time movement trajectory of the object over the period of time that encompasses, or may be equal to, the period of time identified with the set of discrete time periods.

Figure 4:
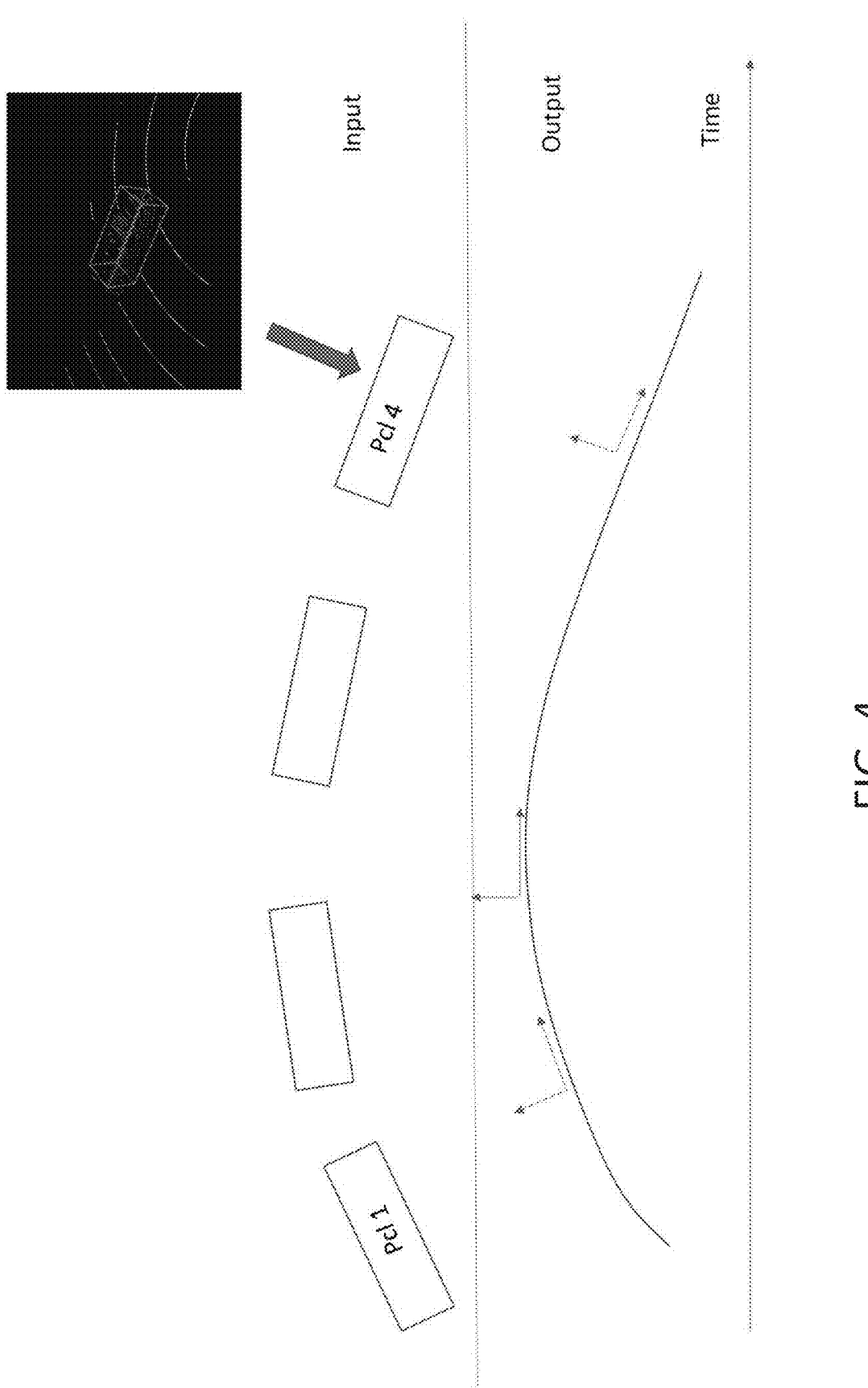
FIG. 4 illustrates an example of input and output data used in accordance with an object trajectory estimation process, in accordance with one or more aspects of the present disclosure.

To this end, FIG. 4 illustrates an example of input and output data used in accordance with an object trajectory estimation process, in accordance with one or more aspects of the present disclosure. The input and outputs of the object trajectory estimation techniques as described herein, which again may be an algorithm or other suitable process, may be referred to herein as "system inputs" and "system outputs." Thus, the upper portion of FIG. 4 illustrates an example system input, which again includes multiple temporal point cloud data sample sets (four in this example) and a corresponding 3D bounding box for each of the four discrete time periods.

Although four discrete time periods are shown, this is for case of explanation and purposes of brevity, and the embodiments described herein may receive system input data for any suitable number of discrete time periods depending upon the availability of the data, the desired accuracy of the output data, the particular application, etc. As will be further discussed below, the system input may be provided for each object for which a continuous time movement trajectory is to be computed. Therefore, the system output includes, for one or more vehicles identified in the system input data, a continuous time movement trajectory T(t). In other words, the continuous time movement trajectory may facilitate the projection of a specific vehicle (i.e. a set of temporal point cloud data samples) to any temporal point within a time period. This time period may, for example, be bounded by the starting and ending discrete time periods of the system input data as noted herein, and thus define the starting and ending time for the object's movement trajectory. In other words, the system output data provides a continuous, versus discrete, time movement trajectory of an object over a time period starting at the starting discrete time period of the movement trajectory of the object (e.g. PCL 1 as shown in FIG. 4), to an ending discrete time period of the movement trajectory of the object (e.g. PCL 4 as shown in FIG. 4). Alternatively, the time period may extend beyond the starting and ending discrete time periods of the system input data, although doing so may reduce accuracy of the projections.

Figure 5:
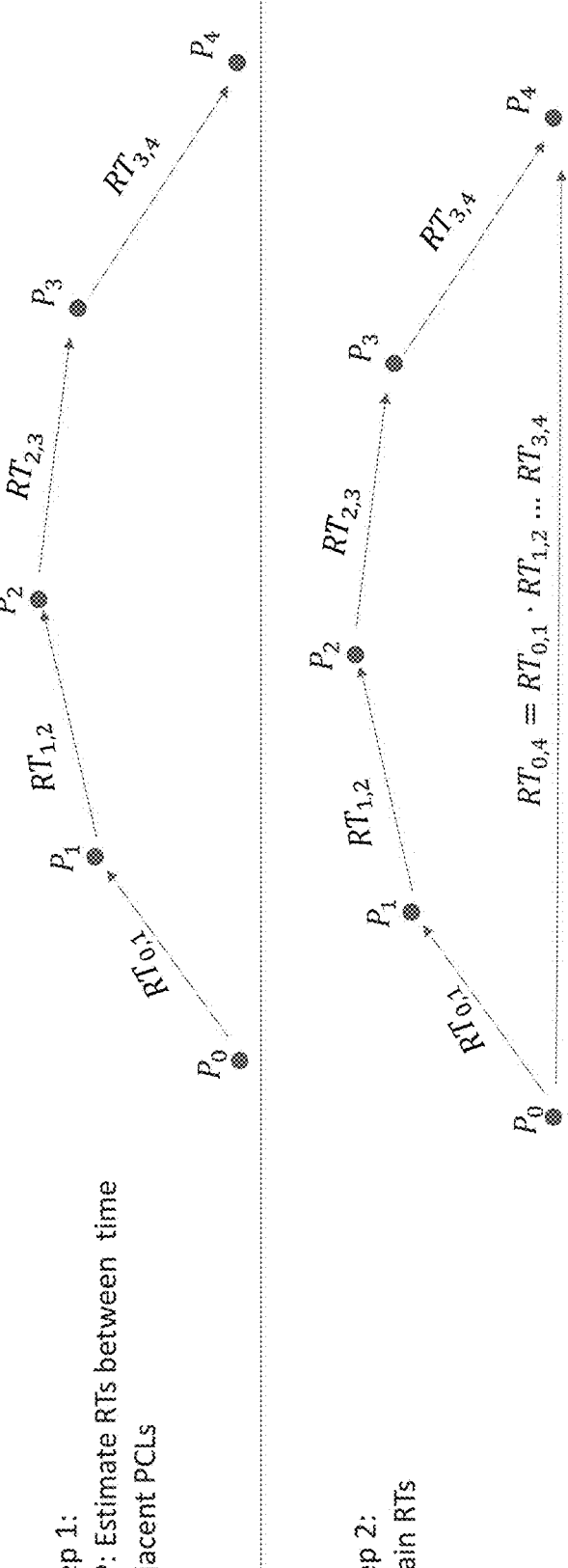
FIG. 5 illustrates a first object trajectory estimation process, in accordance with one or more aspects of the present disclosure.

To do so, and as further described below, a process known as Iterative Closest Point (ICP) may be implemented in conjunction with a mathematical concept known as a rigid body transform. Thus, FIG. 5 illustrates a first object trajectory estimation process, in accordance with one or more aspects of the present disclosure. However, before further describing this first process, it would be prudent to provide an introduction to the mathematics of the rigid body transform.

A rigid body transform is a mathematical transform that utilizes rigid transformation (also called Euclidean transformation or Euclidean isometry), and is a geometric transformation of a Euclidean space that preserves the Euclidean distance between every pair of points. In other words, a rigid-body transform may be computed for any pair of temporal point cloud datasets identified with respective discrete time periods. This computed RT represents a coordinate translation between the two sets of temporal point cloud data samples (i.e. each set being identified with a different discrete time period) with respect to one another to "shift" between each of set of temporal point clouds in 3D space. Thus, the rigid-body transform RT may represent (for 3D coordinates) a four-by-four matrix that, when applied to a set of temporal point cloud data samples, results in a 3D shift of the set of temporal point clouds to a second position in 3D space. A mathematical expression for the application of a rigid-body transform RT is shown in Equation 1 below as follows:

$$RT \cdot \tilde{x} = \begin{bmatrix} R & T \\ 0 & 1 \end{bmatrix} \cdot \tilde{x} = R \cdot x + T \qquad \text{Eqn. 1}$$

In Equation 1 above, the rigid-body transform (RT) is provided for a 3D coordinate data transformation, and comprises a 4×4 matrix that includes a rotation matrix R representing a 3×3 matrix, and a translation vector T representing a 1×3 matrix. Thus, for any set of coordinates $\tilde{x}$ identified with a set of temporal point cloud data samples, a new set of 3D coordinates is calculated by multiplying the 3D coordinates by the rotation matrix R and then adding the translation vector T. Thus, a given set of 3D coordinates, e.g. a first set of temporal point cloud data samples at one discrete time period, may be translated to "correspond" to another set of temporal point cloud data samples associated with a second, different discrete time period by applying the rigid-body transform RT to the first set of temporal point cloud data samples. However, although this technique is trivial when transforming from one point in 3D space to another point in 3D space, this process is more complex when attempting to compute an RT that results in the transformation (i.e. correspondence) of two sets of point cloud data samples in 3D space between one another. To this end, a rigid-body transform may be computed in accordance with Equation 2 below as follows:

$$\text{argmin}_{RT} \sum \|RT \cdot x_i - y_i\|^2 \qquad \text{Eqn. 2}$$

Equation 2 defines the computation of a rigid-body transform RT for sets of temporal point cloud data samples via the minimization of a sum of squares. The sum of squares that is minimized in Equation 2 is a difference between the application of a computed RT to a set of 3D coordinates and a target set of 3D coordinates (e.g. another set of temporal point cloud data samples). Thus, a rigid-body transform RT may be computed by performing a number of iterations of RT computations until this error has been minimized or meets a predefined threshold error value.

ICP is a known technique that functions to estimate the RT between two sets of 3D coordinates with unknown correspondences. To do so, an ICP algorithm may perform several iterations in which a closest point correspondence (i.e. a "Nearest Neighbor") is identified, an RT is estimated between point correspondences, and then the RT is applied and the resulting error computed. This process may be iteratively repeated using the previously-computed RT until a solution is found through convergence, e.g. when a target error threshold value is achieved. Furthermore, the ICP process utilizes an initial input or "guess" for the RT as a starting point to the iterative process. Advantageously, to improve the chances of the ICP algorithm to converge correctly, the embodiments described herein may utilize the temporal point cloud data samples associated with the two corresponding 3D bounding boxes as noted above, as the geometry of each 3D bounding box simplifies the computation for the RT mapping. Of course, other techniques to provide this initial RT input may also be implemented, including known techniques to do so.

Turning now to FIG. 5, each temporal point cloud data sample set as discussed above is identified with a respective discrete time period and denoted as $P_0$, $P_1$, $P_2$, $P_3$, $P_4$. Thus, the first object trajectory estimation process in accordance with an embodiment includes computing, for each successive pair of temporal point cloud data sample sets, a rigid-body transform RT that functions to transform each temporal point cloud data sample set in 3D space from one discrete time period to another discrete time period. The rigid-body transforms are thus denoted by way of the pairing of temporal point cloud data sample sets that are transformed via the RT, e.g. $RT_{0,1}$, $RT_{1,2}$, etc. Each of these RTs may be computed, for example, via an ICP process as noted above, or any other suitable process, including known processes.

In the second step, each of the computed RTs are "chained" together such that the temporal point cloud data sample set identified with the starting discrete time period may be transformed to the temporal point cloud data sample set identified with the ending discrete time period within the object's movement trajectory. For example, $RT_{0,4}$ represents such a transformation, and includes the application of each computed RT (i.e. the RT computed for each pairing of temporal point cloud data sample sets at different discrete time periods).

Next, in the third step, interpolation of the RTs is applied to estimate an RT at any time period between the discrete time periods for which the RT was computed in the first step. As a result, the RT may be computed for any time period within the movement trajectory of the object, and in doing so the 3D coordinates of the object in space may likewise be ascertained using the corresponding interpolated RT.

However, the use of this first object trajectory estimation process has some drawbacks. For example, the ICP process may provide incorrect estimations via interpolation. Moreover, noisy and/or inaccurate ICP measurements may provide RT data that introduces a drift in the results that accumulates over multiple RT computations. This may be an issue of particular interest when the "chaining" step is performed, as the accumulated errors may result in an inaccurate translation of 3D coordinates between longer discrete time periods within the movement trajectory, e.g. between the starting and ending positions. This may cause the computed ending position of the object to deviate significantly from the actual position of the object at that discrete time period.

Figure 6:
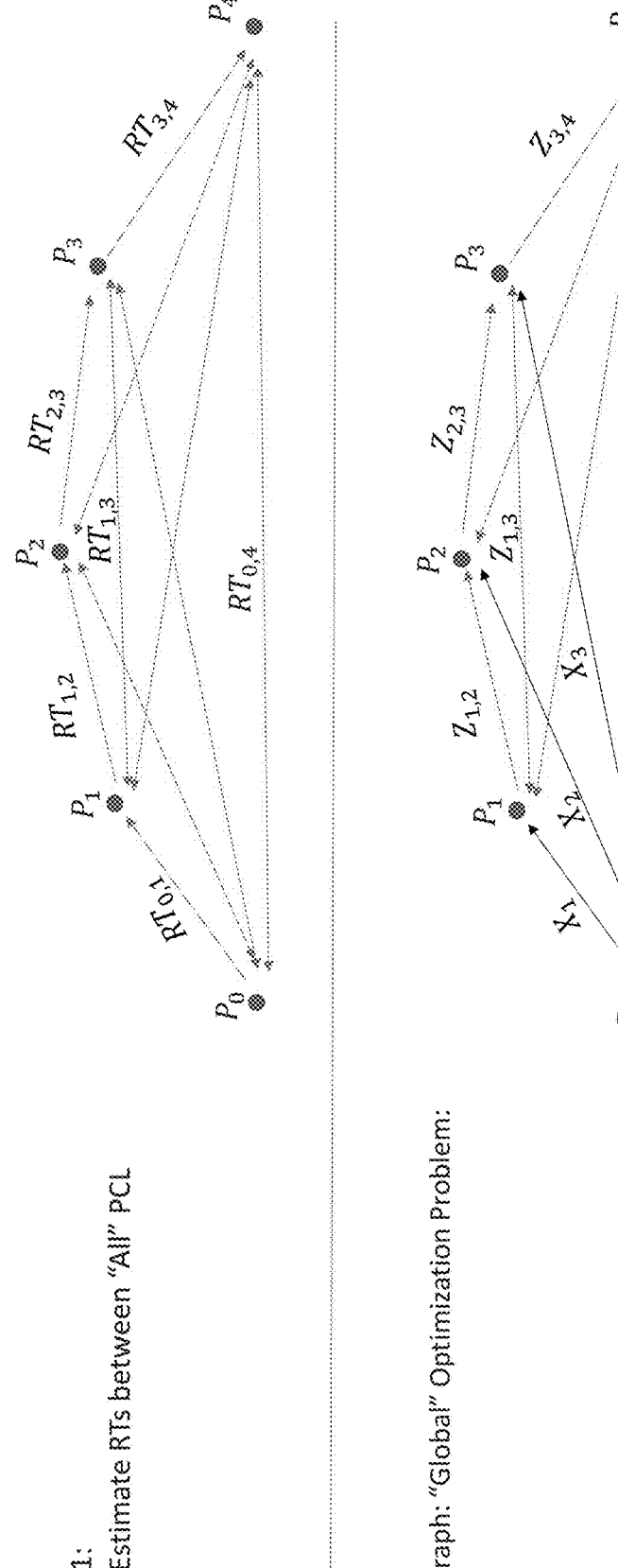
FIG. 6 illustrates a second object trajectory estimation process, in accordance with one or more aspects of the present disclosure.

Thus, to remedy these issues, FIG. 6 illustrates a second object trajectory estimation process, in accordance with one or more aspects of the present disclosure. Like the first process, the second object trajectory estimation process may also compute, for each successive pair of temporal point cloud data sample sets, a rigid-body transform RT that functions to transform each temporal point cloud data sample set in 3D space from one discrete time period to another discrete time period. Again, this may include executing an Iterative Closest Point (ICP) algorithm on each respective pair of temporal point cloud data sample sets to identify, via a convergence of the ICP algorithm, the mapping of 3D coordinates between each respective pair of temporal point cloud data sample sets.

However, the second object trajectory estimation process also computes the rigid-body transform RT for other pairs of temporal point cloud data sample sets within the movement trajectory time period. For example, and as shown in FIG. 6, the second object trajectory estimation process functions to compute an initial, or first rigid transform dataset, that comprises multiple rigid-body transforms. Each of these rigid-body transforms represents an RT that functions to transform, for each pairing of temporal point cloud data sample sets, a transformation in 3D space from one discrete time period to another discrete time period as noted above. Thus, the first rigid-body transform dataset comprises rigid-body transform data (e.g. each of the RTs per temporal point cloud data sample set pairing) that identifies a mapping of 3D coordinates between each respective pair of temporal point cloud data sample sets. Although FIG. 6 illustrates the RT being computed for each combination of temporal point cloud data sample sets within the movement trajectory (i.e. for all pairs), this is by way of example and not limitation, and embodiments include alternatively computing a lesser number of RTs based upon system hardware, processing requirements, desired accuracy, etc. Thus, the first rigid-body transform dataset comprises rigid-body transform data identified with any number of pairings of the temporal point cloud data sample sets greater than those computed in accordance with the first object trajectory estimation process.

In any event, once the first rigid-body transform dataset is computed, the second object trajectory estimation process comprises the use of a second step in which a pose graph optimization (PGO) is performed to compute a second or "final" rigid-body transform dataset. The PGO may be performed in accordance with any suitable techniques, such as a graph-based Simultaneous Localization and Mapping (SLAM), for example. The output of the PGO provides, as part of the final rigid-body transform dataset, the rigid-body transforms denoted in FIG. 6 as $X_1$, $X_2$, $X_3$, and $X_4$.

To do so, the PGO functions to minimize a sum of errors resulting from mapping the 3D coordinates between the first temporal point cloud data sample set identified with the discrete time period at the start of the movement trajectory (i.e. $P_0$) and each of the other temporal point cloud data sample sets identified with the other discrete time periods within the movement trajectory of the object (i.e. $P_1$, $P_2$, $P_3$, $P_4$). Thus, the PGO may thus be defined in accordance with Equations 3-5 below as follows:

$$O(N) \text{variables} \{X_1\} - \text{Poses relative to } P_0 \qquad \text{Eqn. 3:}$$

$$O(N^2) \text{contraints: } Z_{i,j} \cdot X_i \approx X_j \qquad \text{Eqn. 4:}$$

$$\text{argmin}_X \Sigma_{i,j} e_{i,j}(X_i, X_j) \qquad \text{Eqn. 5:}$$

In other words, the terms $O(N)$ and $O(N^2)$ indicate an estimate of the number of "instances" that are used with respect to the argmin function. The total number $O(N)$ of variables may be represented as a vector of variables X, with the number of these variables being a function of the number of discrete time periods for which the rigid-body transforms are to be computed within the movement trajectory, such as the four $(X_1, X_2, X_3, X_4)$ as shown in FIG. 6. The number of constraints $O(N^2)$ is identified with the initial RT computations, such that each vector $X_i$, $X_j$ is identified with a minimization of a correspondence error resulting from the application of the initial RT values with respect to pairs of temporal point cloud data sample sets (i, j) as shown in FIG.

6. Thus, the initial rigid-body transform data set is represented in the lower portion of FIG. 6 and is denoted as $Z_{i,j}$, which are used as the constraints for the pose-graph optimization process. Thus, although not every combination of the temporal point cloud data sample set pairings is denoted in the lower part of FIG. 6, the initial rigid-body transform data set used as the constraints for the pose-graph optimization process may comprise every combination of the initial rigid-body transform data set, as shown by the various arrows. Thus, and as noted below, the initial rigid-body transform data set may comprise, for N=5 temporal point cloud data sample sets, a total of 10 temporal point cloud data sample set pairings, each one being identified with a respective rigid-body transform RT. The initial rigid-body transform data set, denoted as $Z_{i,j}$, may remain fixed values to serve as the constraints to the pose-graph optimization process.

Thus, if there are N sets of temporal point cloud data samples, then the argmin function may be executed using 6*(N−1) variables (e.g. 6 for each rigid-body transform X and a total of N−1 rigid-body transform). The end result of the computation in accordance with these variables results in the "final" rigid-body transform dataset X in accordance with the argmin function. In other words, for the example shown in FIG. 6, six variables need to be determined for each rigid-body transform X, with a total of N−1 (4 in this example) "final" rigid transforms X being computed using the initial RT computations (the initial rigid-body transform data set denoted as $Z_{i,j}$) as the constraints. Again, there may be a number of (N−1)*N/2 constraints (10 in this example), which represents the initial rigid-body transforms computed from each of the combinations of a pairs of temporal point cloud data sample sets, e.g. as shown in FIG. 6.

In this way, the PGO functions to utilize the first rigid-body transform dataset as constraints to output the second, or "final" rigid-body transform dataset that includes the rigid-body transforms $X_1$, $X_2$. $X_3$, and $X_4$. By computing a larger number of rigid-body transform datasets and using the constraint conditions that minimize the sum of errors resulting from using the first set of rigid-body transforms as noted above, the rigid-body transforms may be computed with greater accuracy by preventing the issues associated with drift and accumulated error as noted above for the first object trajectory estimation process. As a further example, the pose-graph may be computed in accordance with a least squares error minimization technique, which is expressed below in Equation 6 as follows:

$$x^* = \operatorname{argmin}_x \sum_{i,j} e_{i,j}^T(x_i, x_j)\Omega_{ij}e_{ij}(x_ix_j) \qquad \text{Eqn. 6}$$

Thus, the error function for a single constraint may be expressed in accordance with Equation 7 below as follows:

$$e_{ij}(x_ix_j) = t2v\big(Z_{ij}^{-1}\big(X_i^{-1}X_j\big)\big) \qquad \text{Eqn. 7}$$

With reference to Equation 7 above, $$Z_{ij}^{-1}$$

represents the error measurement, and $$X_i^{-1}X_j$$

represents $X_j$ referenced with respect to $X_i$. Thus, the error takes a value of zero in accordance with the following condition, which is represented below in accordance with Equation 8 as follows:

$$Z_{ij} = \big(X_i^{-1}X_j\big) \qquad \text{Eqn. 8}$$

It is noted that $\Omega_{ij}$ represents an information matrix, which is the inverse of the covariance matrix and is an output of the ICP process.

Once the final set of rigid-body transforms are computed as part of this process, the temporal point cloud data sample sets and the final rigid-body transform dataset may be used to compute a continuous time movement trajectory of the object over a time period. Again, this time period may encompass the starting discrete time period of the movement trajectory of the object ($P_0$) and the ending discrete time period of the movement trajectory of the object (i.e. $P_4$), as well as any time within this time period.

It is noted that the continuous time movement trajectory of the object may be computed using by performing an interpolation between any pair of the final set of rigid-body transforms to determine a rigid-body transform for any time period within the movement trajectory. That is, the final rigid-body transform dataset comprises the rigid-body transforms X1, X2, X3, X4, but in contrast to the conventional techniques noted herein, interpolating between the discrete times P1, P2, P3, and P4 provides a much better result because the errors are reduced using the pose-graph optimization. Thus, although the term "continuous" is used herein, this refers to the ability to compute the position of the object at any point along the movement trajectory via interpolation of the final set of rigid-body transforms. The resulting movement trajectory of the object that may be generated by way of this process may include the position of the object in accordance with any suitable granularity and/or number of discrete time points within the time period encompassed by the movement trajectory of the object.

In embodiments, the ICP algorithm used to compute the initial set of rigid-body transforms may be modified. For instance, the ICP process may utilize a point-to-point algorithm or, alternatively, a point-to-plane ICP algorithm.

In accordance with a point-to-plane ICP algorithm, the rigid-body transforms may alternatively be computed to align each pair of temporal point cloud data sample sets. For this implementation, however, the points and normals in each sample set are aligned with one another, respectively. Such techniques may be particularly useful when sparse lidar is used to determine the depth data of the objects for which a movement trajectory is to be estimated, as this reduces the need for an exact point-to-point correspondence. For example, a point-to-plane ICP algorithm may compute the initial rigid-body transforms in accordance with Equation 9 below as follows:

$$\operatorname{argmin}_{RT} \sum \|(RT \cdot x_i - y_i) \cdot N_i\|^2 \qquad \text{Eqn. 9}$$

In Equation 9 above, $x_i$ and $y_i$ represent the 3D coordinates of a point in a temporal point cloud data sample set, and $N_i$ represents an estimated surface normal at $y_i$. The errors may once again be minimized by iteratively computing the RT until a threshold error condition is satisfied.

As yet a further modification, embodiments include the reduction of the degrees of freedom from six to three, which may be particularly useful for objects in a driving environment that contains a road or other defined surface. To do so, the depth data (e.g. LIDAR data points) identified with each of the temporal point cloud data sample sets may be utilized to estimate the road surface near or under an object such as a vehicle. This may be achieved, for example, by collecting each data sample within a temporal point cloud data sample set having a "road" semantic label. From this information, a road or surface plane may then be identified, and the temporal point cloud data sample sets for each object may be aligned with its respective plane. The point-to-point or point-to-plane ICP algorithms may thus be performed using these reduced degrees of freedom to compute the rigid-body transforms, which may increase the convergence time and/or allow the RTs to be computed with a less process-intensive manner.

Any of the above-referenced ICP algorithms may be implemented in accordance with the first or the second object trajectory estimation process to compute the final rigid-body transforms and the resulting continuous time movement trajectory of the object over a time period. In any event, to further reduce the processing time and/or to decrease the convergence time of the ICP algorithms, the embodiments described herein may advantageously reduce the number of data samples in each respective pair of temporal point cloud data sample sets used for computing a respective rigid-body transform. These techniques are directed to the identification of outlier data samples that may cause nonconvergence of the ICP, introduce error into the process, and/or result in excessive iterations to be performed before converging to an RT solution.

As one example, the data samples within each pair of temporal point cloud data sample sets may be filtered according to a joint coverage region. For example, the first or the second object trajectory estimation process as discussed above may include a "pre-processing" operation that includes filtering the data samples such that, prior to computing the RT for each pair of temporal point cloud data sample sets, outlier data samples are removed. Such outlier data samples may correspond, for example, to data samples in each pair of temporal point cloud data sample sets that do not share a common 3D region with one another. The size, shape, and orientation of this common region may be predetermined or identified based upon an analysis of the data samples common to each pair of temporal point cloud data sample sets, in various embodiments.

Figure 7B:
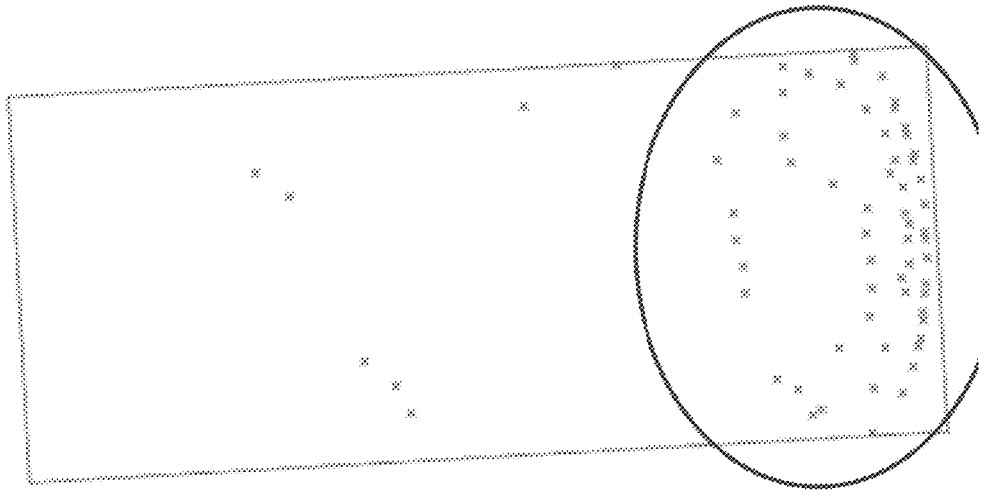
FIGS. 7A and 7B illustrate data sample sets identified with a first example sample point reduction process used in accordance with an ICP algorithm, in accordance with one or more aspects of the present disclosure.
Figure 7A:
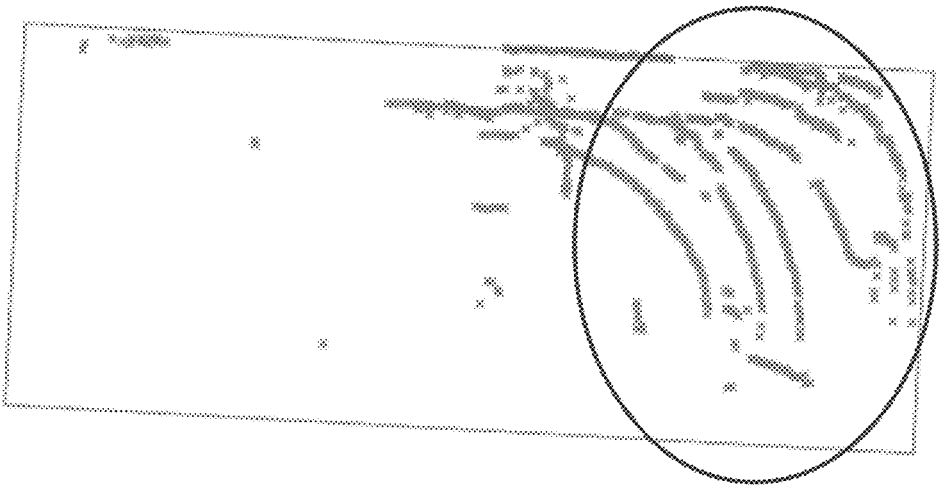

For instance, and as shown in FIGS. 7A-7B, data samples are shown with respect to a pair of temporal point cloud data sample sets, one in FIG. 7A and another in FIG. 7B. From an analysis of the data samples, it can be determined that one region of an object (circled) contains a higher number of data samples common to both temporal point cloud data sample sets. A thresholding system may be implemented to facilitate this determination. For instance, if a threshold number of data samples are contained within a 3D region (70%, 75%, 80%, etc.) common to both temporal point cloud data sample sets, then the data samples outside this region may be discarded for the purpose of computing the RT.

Figure 8:
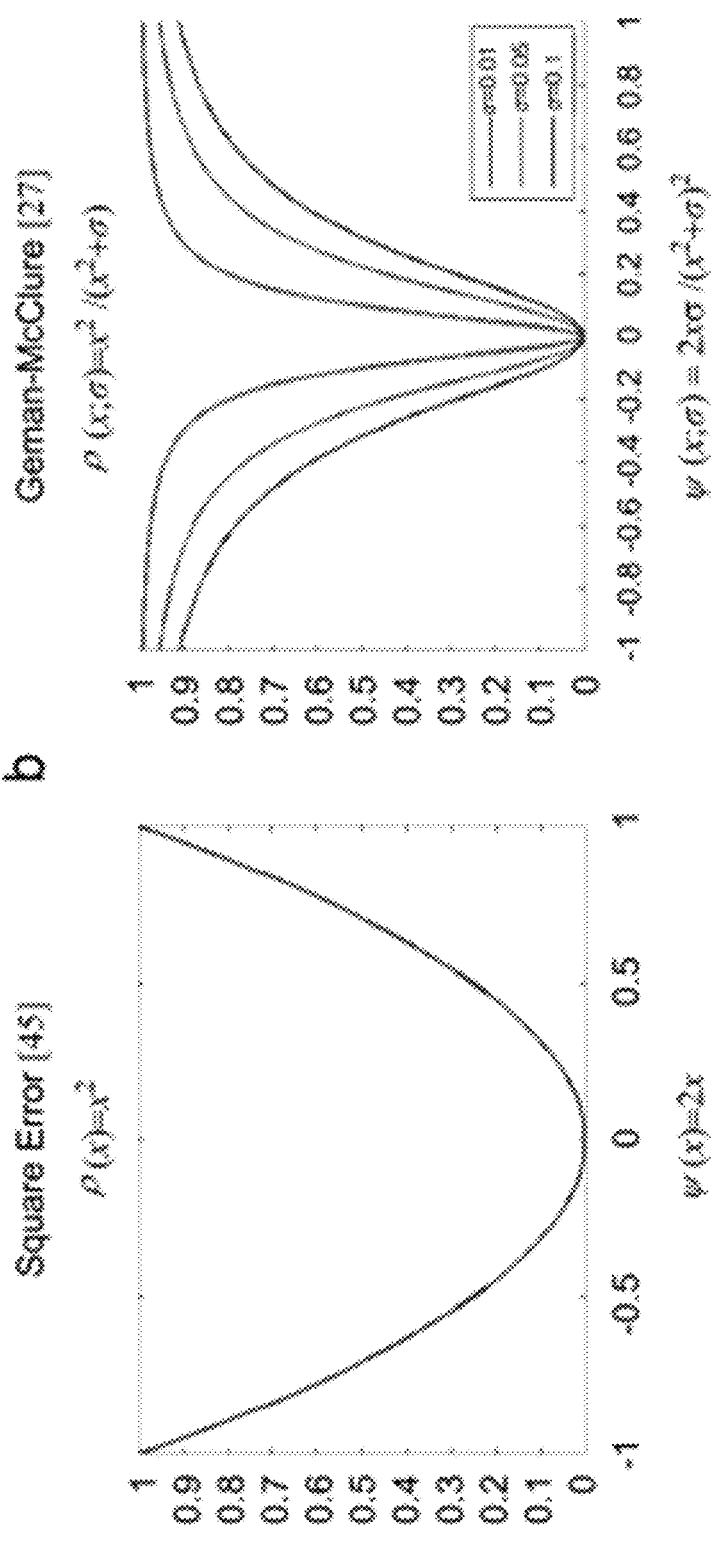
FIG. 8 illustrates functions identified with a second example sample point reduction process used in accordance with an ICP algorithm, in accordance with one or more aspects of the present disclosure.

As another example, FIG. 8 illustrates functions identified with a second example sample point reduction process used in accordance with an ICP algorithm, in accordance with one or more aspects of the present disclosure. In the process discussed herein with respect to FIG. 8, a "robust kernel" is implemented to eliminate the impact of erroneous correspondences, which may be represented below in accordance with Eqns. 10 and 11 as follows:

$$\operatorname{argmin}_{RT} \sum \rho(\|(RT \cdot x_i - y_i) \cdot N_i\|), \qquad \text{Eqn. 10}$$

$$\rho(t) - \text{Robust Kernel} \qquad \text{Eqn. 11}$$

It is noted that p (t) represents a scalar function, with some examples being shown in FIG. 8 that include the square error and Geman-McClure functions, as further noted below.

In other words, the initial rigid-body transforms RT may be computed in a manner that takes into consideration the error resulting from a point-to-point or point-to-plane correspondence between pairs of temporal point cloud data sample sets. For example, the outlier sample points noted above with respect to FIGS. 7A-7B may result in a high error during the ICP process of computing the RT. Such techniques may be utilized to perform a filtering operation that removes outlier data samples by using only the data samples from each respective pair of temporal point cloud data sample sets that, when used for one or more ICP iterations of the ICP algorithm, result in an error value that is less than a threshold error value.

For example, in an embodiment, the error losses are computed, (e.g. the $O(N^2)$ constraints described above), and it is recognized that "inlier" data samples will yield a relatively small error (close to 0), while "outlier" data samples will yield relatively high errors. In this way, the robust kernel technique exploits this notion to remove or greatly reduce the impact of the constraints that provide a high error (e.g. an error greater than a predetermined error threshold value). FIG. 8 provides a square error and Geman-McClure error graph as examples of the types of error that may be utilized in accordance with such embodiments, although it is noted that the robust kernel may implement any other suitable error derivation and/or error minimization techniques.

Again, once the final rigid-body transform dataset is computed, the continuous time movement trajectory T(t) of each object may computed as discussed herein using interpolation techniques. The embodiments include the generation of a ground truth dataset that includes the use of this continuous time movement trajectory. The continuous time movement trajectory may thus be computed for each object within the set of image frames that are representative of a driving environment, as noted above. In other words, a continuous time movement trajectory may be computed for each moving object identified with the image frames that were used to provide the input to the object trajectory estimation processes as described herein. Once the continuous time movement trajectories are computed in this manner, the ground truth dataset may be generated to estimate the position of an object (e.g. a vehicle) at any number of timestamps associated with the image frames. The temporal point cloud data sample sets identified with the object may then be moved to any suitable position associated with the various timestamps, and the temporal point cloud data set associated with the object may be projected to the image at the various timestamps. This process thus supplements the original set of image frames to provide the ground truth dataset by providing the projected temporal point cloud data sets computed via the use of the continuous time movement trajectory at various times within the set of image frames. In other words, an initial set of image frames may, by way of the embodiments discussed herein, be augmented with a projection of temporal point cloud data sets that has been computed using the continuous time movement trajectories to provide a ground truth dataset.

Once the ground truth dataset is generated in this manner, it may be used to train a machine learning model that predicts, at inference, a movement trajectory of objects in acquired image frames when navigating a driving environment. This training process and machine learning model may comprise any suitable type of trained network, such as a neural network, a deep neural network, etc. Thus, a machine learning model may be trained in accordance with any suitable training techniques, including known techniques, to yield a trained model. This trained model may then be deployed to a suitable computing system of a vehicle, e.g. as part of the safety system 200 as discussed herein, to enable the safety system 200 to accurately predict the movement trajectories of classified objects such as vehicles, for instance.

Once deployed in this manner, the safety system 200 may utilize the trained machine learning model to perform any suitable number and/or type of vehicle-based functions. These vehicle-based functions may be performed, for instance, in response to the safety system 200 predicting, at inference, a movement trajectory of another object (e.g. a vehicle) within the driving environment. Some examples of such vehicle-based functions may include steering, braking, accelerating, etc., to avoid a potential collision with the vehicle or to otherwise mitigate risk while navigating the driving environment.

Figure 9:
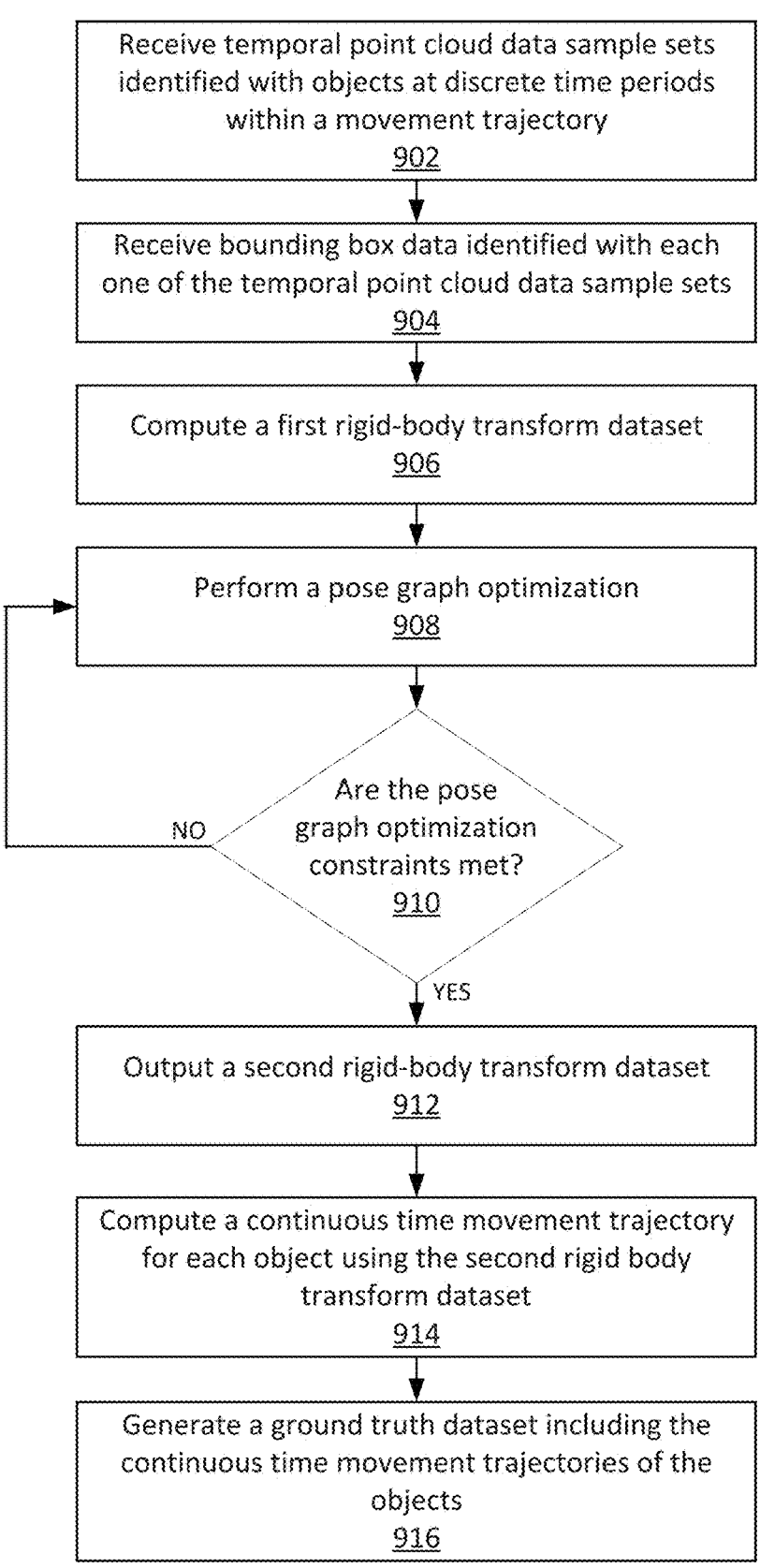
FIG. 9 illustrates an example process flow, in accordance with one or more aspects of the disclosure.

FIG. 9 illustrates an example process flow, in accordance with one or more aspects of the disclosure. The process flow 900 may include alternate or additional steps that are not shown in FIG. 9 for purposes of brevity, and may be performed in a different order than the steps shown in FIG. 9.

With reference to FIG. 9, the process flow 900 may be a computer-implemented method executed by and/or otherwise associated with one or more processors (processing circuitry) and/or storage devices. The functionality associated with the process flow 900 as discussed herein may be performed, for instance, via any suitable computing device and/or processing circuitry, which may be identified with a standalone computing device and/or computing system. Additionally or alternatively, the functionality associated with the process flow 900 may be performed, for example, via any suitable number of computing devices and/or computing systems, which may include networked, cloud-based, or any suitable architecture of computing devices that enables the computing devices to communicate with one another and/or to work in conjunction with one another. In an embodiment, the computing device and/or computing system may be identified with the computing device 1000 as shown and described herein with respect to FIG. 10. Additionally or alternatively, the functionality associated with the process flow 900 may be performed, for example, via any suitable computing device and/or processing circuitry identified with the vehicle 100 and/or the safety system 200. This may include, for example, the one or more processors 102, one or more of the processors 214A, 214B, 216, 218, etc., executing instructions stored in a suitable memory (e.g. the one or more memories 202). Additionally or alternatively, the functionality associated with the process flow 900 may be performed, for example, via processing circuitry identified with any suitable type of computing device that may be identified with the vehicle 100 (e.g. a chip, an aftermarket product, etc.) or that otherwise communicates with one or more components of the vehicle 100.

The process flow 900 may begin by receiving (block 902) temporal point cloud data sample sets identified with objects at discrete time periods within a movement trajectory. The temporal point cloud data sets may, for example, be identified with an object and provided as input to an algorithm, application, etc., that performs the first or second object trajectory estimation process as discussed herein. For example, the temporal point cloud data sets may, for example, be identified with the temporal point cloud data sets $P_0$, $P_1$, $P_2$, $P_3$, $P_4$, etc., as shown and discussed herein with reference to FIGS. 5 and 6.

The process flow 900 may include receiving (block 904) bounding box data identified with each object for which a movement trajectory is to be computed at discrete time periods within a movement trajectory. The bounding box data may, for example, be identified with an object in 3D space and provided as input to an algorithm, application, etc., that performs the first or second object trajectory estimation process as discussed herein.

The process flow 900 may include computing (block 906) a first rigid-body transform dataset. The first rigid-body transform dataset may, for example, be identified with an object and provided as input to an algorithm, application, etc., that performs the second object trajectory estimation process as discussed herein as described with respect to FIG. 6. For example, the first rigid-body transform dataset may include any suitable number of rigid-body transforms RT, each being identified with a respective pair of temporal point cloud data sample sets, as shown and discussed herein with reference to FIG. 6.

The process flow 900 may comprise performing (block 908) a pose-graph optimization as discussed herein with reference to the second step as shown in FIG. 6. The pose-graph optimization may be performed in accordance with any suitable techniques, including known techniques.

The process flow 900 may comprise determining (block 910) whether the pose-graph optimization constraints are met, as discussed herein with reference to the second step as shown in FIG. 6, for example. The pose-graph optimization constraints may include, for example, the minimization of errors identified with a correspondence of points when applying the first set of computed rigid-body transforms (block 906). The constrains may be, for example, those discussed herein with respect to the pose-optimization techniques and Equations 3-8. Thus, the pose-graph optimization process may continue (e.g. via an iterative process) until the constraint conditions are met.

Once the pose-graph optimization constraint conditions are met, the process flow 900 may comprise outputting (block 912) a second rigid-body transform dataset. This second rigid-body transform dataset may, for example, include a second set of rigid-body transforms that comprise a mapping of 3D coordinates between a first one of the temporal point cloud data sample sets that is identified with e.g. a starting discrete time period of the movement trajectory of the object, and temporal point cloud data sample sets that are identified with other respective discrete time periods of the movement trajectory of the object. For example, the rigid-body transforms included in the second rigid-body transform dataset may include the rigid-body transforms $X_1$, $X_2$, $X_3$, and $X_4$, as shown and discussed herein with reference to FIG. 6.

The process flow 900 may comprise computing (block 914) a continuous time movement trajectory for each object using the second rigid-body transform dataset. The term continuous in this context may include, for example, the computation of a projection of a position of any one of the temporal point cloud data sample sets (e.g. the temporal point cloud data sample set identified with the starting discrete time period) to any other time period within the overall movement trajectory, which may utilize an interpolation of the final rigid-body transform datasets as discussed above to calculate the projection of a position of any one of the temporal point cloud data sample sets to another point in time as needed. Thus, the continuous time movement trajectory $T(t)$ may represent a function that may include the interpolation of the final rigid-body transform datasets and the application of the interpolated rigid-body transform datasets to enable the mapping of a temporal point cloud data sample set to any time t within a trajectory time period $0 \leq t \leq T$, with T representing the ending discrete time period and 0 representing the starting discrete time period within the overall movement trajectory of a target object. It will be understood, however, that the actual computation of the temporal point cloud data sample set in accordance with a continuous time movement trajectory may be limited to the time periods identified with the image frames or to another suitable granularity.

The process flow 900 may comprise generating (block 916) a ground truth dataset including the continuous time movement trajectories of each of the objects. Again, this ground truth data set may comprise the image frames supplemented with the continuous time movement trajectory data for each moving object, as noted herein. The ground truth data set that is generated in this manner may be used to train a machine learning model that is deployed to a vehicle computing system. In this example, the trained machine learning model enables the vehicle computing system to predict, at inference, a movement trajectory of objects in acquired image frames when navigating a driving environment.

Figure 10:
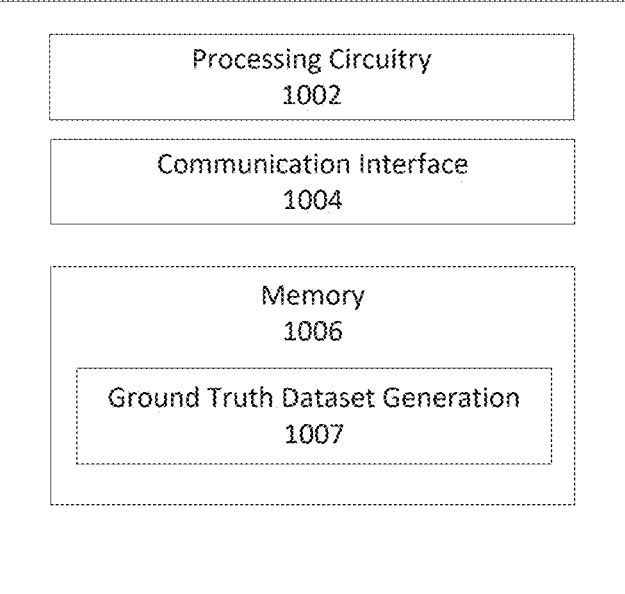
FIG. 10 illustrates an example computing device, in accordance with one or more aspects of the disclosure.

FIG. 10 illustrates an example computing device, in accordance with one or more aspects of the disclosure. The aspects described herein may be performed via any suitable computing device, which may be identified with a component of the safety system 200 as discussed herein, or a separate computing device that may be implemented within the vehicle 100 or in any separate suitable environment (e.g. the computing device 1000). Thus, in an aspect, the computing device 1000 as shown and described with respect to FIG. 10 may be identified with a component of the safety system 200 as discussed herein, or a separate computing device that may be implemented within the vehicle 100 or in any separate suitable environment.

In other aspects, the computing device 100 may be identified with any suitable type of standalone computing device such as a desktop computer, laptop, server computer, tablet computer, mobile device, a networked computer and/or computing system, a cloud computing device and/or architecture, or components thereof such as a GPU, CPU, etc. As further discussed below, the computing device 100 may perform the various functionality as described herein and as shown in the accompanying Figures. To do so, the computing device 100 may include processing circuitry 1002, a communication interface 1004, and a memory 1006. The components shown in FIG. 10 are provided for ease of explanation, and the computing device 1000 may implement additional, less, or alternative components as those shown in FIG. 10.

The processing circuitry 1002 may be configured as any suitable number and/or type of computer processors, which may function to control the computing device 1000 and/or other components of the computing device 1000. The processing circuitry 1002 may be identified with one or more processors (or suitable portions thereof) implemented by the computing device 100, and may include processors identified with the safety system 200 as discussed herein (e.g. the one or more processors 102, one or more of the processors 214A, 214B, 216, 218, etc.) The processing circuitry 1002 may be identified with one or more processors such as a host processor, a digital signal processor, one or more microprocessors, graphics processors, a graphics processing unit (GPU), baseband processors, microcontrollers, an application-specific integrated circuit (ASIC), part (or the entirety of) a field-programmable gate array (FPGA), etc.

In any event, the processing circuitry 1002 may be configured to carry out instructions to perform arithmetical, logical, and/or input/output (I/O) operations, and/or to control the operation of one or more components of computing device 1000 to perform various functions as described herein. The processing circuitry 1002 may include one or more microprocessor cores, memory registers, buffers, clocks, etc., and may generate electronic control signals associated with the components of the computing device 1100 to control and/or modify the operation of these components. The processing circuitry 1002 may communicate with and/or control functions associated with the communication interface 1004 and/or the memory 1006. The processing circuitry 1002 may be configured as any suitable number and/or type of components configured to facilitate the computing device 1000 performing the various functions as discussed herein and as shown in the accompanying Figures.

The communication interface 1004 may be implemented as any suitable number and/or type of components that function to interface with additional devices, and may implement for instance buses, ports, data interfaces, memory controllers, etc. The communication interface 1004 may form part of an overall communication circuitry implemented by the computing device 1000, which may communicate with other computing devices to receive and/or transmit data. For instance, the communication interface 1004 may facilitate the computing device 1000 receiving the inputs used for trajectory estimation, e.g. the image frames, the sets of temporal point clouds, estimated oriented 3D bounding boxes, etc. The communication interface 1004 may additionally or alternatively facilitate the computing device 1000 generating and/or transmitting outputs of the object trajectory estimation processes as discussed herein, e.g. the generated ground truth datasets, computational data such as the first rigid-body dataset. The second rigid-body dataset, the computed continuous time movement trajectories of objects, etc.

The memory 1006 is configured to store data and/or instructions such that, when are executed by the processing circuitry 1002, cause the computing device 1000 (or the vehicle 100 and/or safety system 200 of which the computing device 1000 may form a part) to perform various functions as described herein. The memory 1006 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1006 may be non-removable, removable, or a combination of both. The memory 1006 may be implemented as a non-transitory computer readable medium storing one or more executable instructions such as, for example, logic, algorithms, code, etc.

As further discussed below, the instructions, logic, code, etc., stored in the memory 1006 are represented by module 1007 as shown in FIG. 10, which may enable the various functions of the aspects as described herein to be functionally realized. Alternatively, if implemented via hardware, the module 1007 as shown in FIG. 10 associated with the memory 1006 may include instructions and/or code to facilitate control and/or to monitor the operation of such hardware components. In other words, the module 1007 as shown in FIG. 10 is provided for ease of explanation regarding the functional association between hardware and software components. Thus, the processing circuitry 1002 may execute the instructions stored in the memory 1006 and/or the module 1007, and may optionally do so in conjunction with one or more hardware components, to perform the various functions as discussed herein.

The ground truth dataset generation module 1007 may contain computer-readable instructions that, when expected by the processing circuitry 1002 or other suitable processing circuitry, hardware, processors, etc., perform the functionality as discussed herein with reference to the computation of the continuous time movement trajectories of one or more objects from received input data. The executable instructions stored in the ground truth dataset generation module 1007 may facilitate, in conjunction with execution via the processing circuitry 1002, the computing device 1000 to perform any of the aspects as discussed herein and/or shown in the Figures to generate the ground truth datasets.

EXAMPLES

The following examples pertain to further aspects.

An example (e.g. example 1) relates to a computing device. The computing device comprises a memory configured to store computer-readable instructions; and one or more processors configured to execute the computer readable instructions stored in the memory to: receive a plurality of temporal point cloud data sample sets, each respective one of the temporal point cloud data sample sets comprising a set of three-dimensional (3D) coordinates that represent an object in 3D space at a respective discrete time period within a movement trajectory of the object; compute a first rigid-body transform dataset that comprises rigid body transform data that identifies a mapping of 3D coordinates between a respective pair of temporal point cloud data sample sets from among the plurality of temporal point cloud data sample sets; and perform a pose graph optimization that utilizes the first rigid-body transform dataset as constraints to output a second transform rigid-body transform dataset that comprises a mapping of 3D coordinates between (i) a first one of the plurality of temporal point cloud data sample sets that is identified with a starting discrete time period of the movement trajectory of the object, and (ii) ones of the plurality of temporal point cloud data sample sets that are identified with other respective discrete time periods of the movement trajectory of the object.

Another example (e.g. example 2) relates to a previously-described example (e.g. example 1), wherein the computer-readable instructions stored on the memory, when executed by the one or more processors, further cause the computing device to: compute, using the plurality of temporal point cloud data sample sets and the second transform dataset, a continuous time movement trajectory of the object over a time period from (i) the starting discrete time period of the movement trajectory of the object, and (ii) an ending discrete time period of the movement trajectory of the object.

Another example (e.g. example 3) relates to a previously-described example (e.g. one or more of examples 1-2), wherein the computer-readable instructions stored on the memory, when executed by the one or more processors, further cause the computing device to: generate a ground truth dataset that includes the continuous time movement trajectory of the object within a set of image frames representative of a driving environment; and train, using the ground truth dataset, a machine learning model that predicts, at inference, a movement trajectory of objects in acquired image frames when navigating a driving environment.

Another example (e.g. example 4) relates to a previously-described example (e.g. one or more of examples 1-3), wherein the computer-readable instructions stored on the memory, when executed by the one or more processors, further cause the computing device to: deploy the machine learning model in a safety system of a vehicle; and perform, via the safety system of the vehicle, a vehicle-based function in response to predicting, at inference, a movement trajectory of another vehicle.

Another example (e.g. example 5) relates to a previously-described example (e.g. one or more of examples 1-4), wherein the computer-readable instructions stored on the memory, when executed by the one or more processors, further cause the computing device to compute the first rigid transform dataset by executing an Iterative Closest Point (ICP) algorithm on each respective pair of temporal point cloud data sample sets to identify, via a convergence of the ICP algorithm, the mapping of 3D coordinates between each respective pair of temporal point cloud data sample sets.

Another example (e.g. example 6) relates to a previously-described example (e.g. one or more of examples 1-5), wherein: the object in 3D space comprises a vehicle, and the ICP algorithm comprises a point-to-plane ICP algorithm.

Another example (e.g. example 7) relates to a previously-described example (e.g. one or more of examples 1-6), wherein the computer-readable instructions stored on the memory, when executed by the one or more processors, further cause the computing device to perform the pose graph optimization by minimizing a sum of errors resulting from mapping the 3D coordinates between the first one of the plurality of temporal point cloud data sample sets and each of the plurality of temporal point cloud data sample sets identified with the other respective discrete time periods within the movement trajectory of the object.

Another example (e.g. example 8) relates to a previously-described example (e.g. one or more of examples 1-7), wherein the computer-readable instructions stored on the memory, when executed by the one or more processors, further cause the computing device to compute the first rigid transform dataset by reducing a number of data samples from among each respective pair of temporal point cloud data sample sets used for computing, for each respective pair of temporal point cloud data sample sets, a respective rigid body transform.

Another example (e.g. example 9) relates to a previously-described example (e.g. one or more of examples 1-8), wherein the computer-readable instructions stored on the memory, when executed by the one or more processors, further cause the computing device to reduce the number of data samples used for computing, for each respective pair of temporal point cloud data sample sets, a respective rigid body transform by performing a filtering operation that removes outlier data samples by discarding data samples from among each respective pair of temporal point cloud data sample sets that do not share a common 3D region with one another.

Another example (e.g. example 10) relates to a previously-described example (e.g. one or more of examples 1-9), wherein the computer-readable instructions stored on the memory, when executed by the one or more processors, further cause the computing device to reduce the number of data samples used for computing, for each respective pair of temporal point cloud data sample sets, a respective rigid body transform by performing a filtering operation that removes outlier data samples by using only the data samples from among each respective pair of temporal point cloud data sample sets that, when used for one or more ICP iterations of the ICP algorithm, result in an error value that is less than a threshold error value.

An example (e.g. example 11) relates to a non-transitory computer-readable medium. The non-transitory computer-readable medium has instructions stored thereon that, when executed by processing circuitry of a computing device, cause the computing device to: receive a plurality of temporal point cloud data sample sets, each respective one of the temporal point cloud data sample sets comprising a set of three-dimensional (3D) coordinates that represent an object in 3D space at a respective discrete time period within a movement trajectory of the object; compute a first rigid-body transform dataset that comprises rigid body transform data that identifies a mapping of 3D coordinates between a respective pair of temporal point cloud data sample sets from among the plurality of temporal point cloud data sample sets; and perform a pose graph optimization that utilizes the first rigid-body transform dataset as constraints to output a second transform rigid-body transform dataset that comprises a mapping of 3D coordinates between (i) a first one of the plurality of temporal point cloud data sample sets that is identified with a starting discrete time period of the movement trajectory of the object, and (ii) ones of the plurality of temporal point cloud data sample sets that are identified with other respective discrete time periods of the movement trajectory of the object.

Another example (e.g. example 12) relates to a previously-described example (e.g. example 11), wherein the computer-readable instructions, when executed by the processing circuitry, further cause the computing device to: compute, using the plurality of temporal point cloud data sample sets and the second transform dataset, a continuous time movement trajectory of the object over a time period from (i) the starting discrete time period of the movement trajectory of the object, and (ii) an ending discrete time period of the movement trajectory of the object.

Another example (e.g. example 13) relates to a previously-described example (e.g. one or more of examples 11-12), wherein the computer-readable instructions, when executed by the processing circuitry, further cause the computing device to: generate a ground truth dataset that includes the continuous time movement trajectory of the object within a set of image frames representative of a driving environment; and train, using the ground truth dataset, a machine learning model that predicts, at inference, a movement trajectory of objects in acquired image frames when navigating a driving environment.

Another example (e.g. example 14) relates to a previously-described example (e.g. one or more of examples 11-13), wherein the computer-readable instructions, when executed by the processing circuitry, further cause the computing device to: deploy the machine learning model in a safety system of a vehicle; and perform, via the safety system of the vehicle, a vehicle-based function in response to predicting, at inference, a movement trajectory of another vehicle.

Another example (e.g. example 15) relates to a previously-described example (e.g. one or more of examples 11-14), wherein the computer-readable instructions, when executed by the processing circuitry, further cause the computing device to: compute the first rigid transform dataset by executing an Iterative Closest Point (ICP) algorithm on each respective pair of temporal point cloud data sample sets to identify, via a convergence of the ICP algorithm, the mapping of 3D coordinates between each respective pair of temporal point cloud data sample sets.

Another example (e.g. example 16) relates to a previously-described example (e.g. one or more of examples 11-15), wherein: the object in 3D space comprises a vehicle, and the ICP algorithm comprises a point-to-plane ICP algorithm.

Another example (e.g. example 17) relates to a previously-described example (e.g. one or more of examples 11-16), wherein the computer-readable instructions, when executed by the processing circuitry, further cause the computing device to perform the pose graph optimization by minimizing a sum of errors resulting from mapping the 3D coordinates between the first one of the plurality of temporal point cloud data sample sets and each of the plurality of temporal point cloud data sample sets identified with the other respective discrete time periods within the movement trajectory of the object.

Another example (e.g. example 18) relates to a previously-described example (e.g. one or more of examples 11-17), wherein the computer-readable instructions, when executed by the processing circuitry, further cause the computing device to compute the first rigid transform dataset by reducing a number of data samples from among each respective pair of temporal point cloud data sample sets used for computing, for each respective pair of temporal point cloud data sample sets, a respective rigid body transform.

Another example (e.g. example 19) relates to a previously-described example (e.g. one or more of examples 11-18), wherein the computer-readable instructions, when executed by the processing circuitry, further cause the computing device to reduce the number of data samples used for computing, for each respective pair of temporal point cloud data sample sets, a respective rigid body transform by performing a filtering operation that removes outlier data samples by discarding data samples from among each respective pair of temporal point cloud data sample sets that do not share a common 3D region with one another.

Another example (e.g. example 20) relates to a previously-described example (e.g. one or more of examples 11-19), wherein the computer-readable instructions, when executed by the processing circuitry, further cause the computing device to reduce the number of data samples used for computing, for each respective pair of temporal point cloud data sample sets, a respective rigid body transform by performing a filtering operation that removes outlier data samples by using only the data samples from among each respective pair of temporal point cloud data sample sets that, when used for one or more ICP iterations of the ICP algorithm, result in an error value that is less than a threshold error value.

A method as shown and described.

An apparatus as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect." "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:

a memory configured to store computer-readable instructions; and one or more processors configured to execute the computer-readable instructions stored in the memory to:

receive a plurality of temporal point cloud data sample sets greater than two, each respective one of the temporal point cloud data sample sets comprising a set of three-dimensional (3D) coordinates that represent an object in 3D space at a respective discrete time period within a discrete time movement trajectory of the object;

compute a first rigid-body transform dataset that comprises rigid-body transform data that identifies a mapping of 3D coordinates between each combination of respective pairs of temporal point cloud data sample sets from among the plurality of temporal point cloud data sample sets;

perform a pose graph optimization that utilizes the first rigid-body transform dataset as constraints to output a second rigid-body transform dataset that comprises a mapping of 3D coordinates between (i) a first one of the plurality of temporal point cloud data sample sets that is identified with a starting discrete time period of the discrete time movement trajectory of the object, and (ii) other ones of the plurality of temporal point cloud data sample sets that are identified with other respective discrete time periods of the discrete time movement trajectory of the object;

generate, based upon the plurality of temporal point cloud data sample sets and the second rigid-body transform dataset, a ground truth dataset that includes a computed continuous time movement trajectory of the object within a set of training image frames;

train, using the ground truth dataset, a machine learning model that predicts, at inference, a continuous time movement trajectory of one or more objects in acquired image frames when navigating a driving environment;

deploy the trained machine learning model in a vehicle control system of a vehicle that is configured to control at least one aspect of the operation of the vehicle; and control, via the vehicle control system, a trajectory of the vehicle in response to predicting, using the trained machine learning model, a movement trajectory of the one or more other objects in the driving environment.

2. The computing device of claim 1, wherein the computer-readable instructions stored on the memory, when executed by the one or more processors, further cause the computing device to:

compute the continuous time movement trajectory of the object over a time period from (i) the starting discrete time period of the discrete time movement trajectory of the object, and (ii) an ending discrete time period of the discrete time movement trajectory of the object.

3. The computing device of claim 1, wherein the vehicle control system comprises a safety system of the vehicle, and wherein the computer-readable instructions stored on the memory, when executed by the one or more processors, further cause the computing device to perform, via the safety system of the vehicle, a vehicle-based function in response to predicting, at inference, the continuous time movement trajectory of the one or more objects in the acquired image frames when navigating the driving environment.

4. The computing device of claim 1, wherein the computer-readable instructions stored on the memory, when executed by the one or more processors, further cause the computing device to:

compute the first rigid-body transform dataset by executing an Iterative Closest Point (ICP) algorithm on each respective pair of temporal point cloud data sample sets to identify, via a convergence of the ICP algorithm, the mapping of 3D coordinates between each respective pair of temporal point cloud data sample sets.

5. The computing device of claim 4, wherein:

the object in 3D space comprises a vehicle, and the ICP algorithm comprises a point-to-plane ICP algorithm.

6. The computing device of claim 4, wherein the computer-readable instructions stored on the memory, when executed by the one or more processors, further cause the computing device to:

compute the first rigid-body transform dataset by reducing a number of data samples from among each respective pair of temporal point cloud data sample sets used for computing, for each respective pair of temporal point cloud data sample sets, a respective rigid-body transform.

7. The computing device of claim 6, wherein the computer-readable instructions stored on the memory, when executed by the one or more processors, further cause the computing device to:

reduce the number of data samples used for computing, for each respective pair of temporal point cloud data sample sets, a respective rigid-body transform by performing a filtering operation that removes outlier data samples by discarding data samples from among each respective pair of temporal point cloud data sample sets that do not share a common 3D region with one another.

8. The computing device of claim 4, wherein the computer-readable instructions stored on the memory, when executed by the one or more processors, further cause the computing device to:

reduce a number of data samples used for computing, for each respective pair of temporal point cloud data sample sets, a respective rigid-body transform by performing a filtering operation that removes outlier data samples by using only the data samples from among each respective pair of temporal point cloud data sample sets that, when used for one or more ICP iterations of the ICP algorithm, result in an error value that is less than a threshold error value.

9. The computing device of claim 1, wherein the computer-readable instructions stored on the memory, when executed by the one or more processors, further cause the computing device to:

perform the pose graph optimization by minimizing a sum of errors resulting from mapping the 3D coordinates between the first one of the plurality of temporal point cloud data sample sets and each of the plurality of temporal point cloud data sample sets identified with the other respective discrete time periods within the discrete time movement trajectory of the object.

10. The computing device of claim 1, wherein the computer-readable instructions stored on the memory, when executed by the one or more processors, cause the computing device to compute the continuous time movement trajectory of the object by interpolating between ones of the plurality of temporal point cloud data sample sets identified with the second rigid-body transform dataset.

11. The computing device of claim 1, wherein the computer-readable instructions stored on the memory, when executed by the one or more processors, cause the computing device to:

compute a projection of temporal point cloud data sample sets of the object to one or more time periods using the continuous time movement trajectory; and generate the ground truth dataset by supplementing the set of training image frames with the projection of the temporal point cloud data sample sets of the object.

12. The computing device of claim 1, wherein the computer-readable instructions stored on the memory, when executed by the one or more processors, cause the computing device to control, via the vehicle control system of the vehicle, the trajectory of the vehicle to attempt to avoid a potential collision with the one or more other objects.

13. A non-transitory computer-readable medium having instructions stored thereon that, when executed by processing circuitry of a computing device, cause the computing device to:

receive a plurality of temporal point cloud data sample sets greater than two, each respective one of the temporal point cloud data sample sets comprising a set of three-dimensional (3D) coordinates that represent an object in 3D space at a respective discrete time period within a discrete time movement trajectory of the object;

compute a first rigid-body transform dataset that comprises rigid-body transform data that identifies a mapping of 3D coordinates between each combination of respective pairs of temporal point cloud data sample sets from among the plurality of temporal point cloud data sample sets;

perform a pose graph optimization that utilizes the first rigid-body transform dataset as constraints to output a second rigid-body transform dataset that comprises a mapping of 3D coordinates between (i) a first one of the plurality of temporal point cloud data sample sets that is identified with a starting discrete time period of the discrete time movement trajectory of the object, and (ii) other ones of the plurality of temporal point cloud data sample sets that are identified with other respective discrete time periods of the discrete time movement trajectory of the object;

generate, based upon the plurality of temporal point cloud data sample sets and the second rigid-body transform dataset, a ground truth dataset that includes a computed continuous time movement trajectory of the object within a set of training image frames; and train, using the ground truth dataset, a machine learning model that predicts, at inference, a continuous time movement trajectory of one or more objects in acquired image frames when navigating a driving environment;

deploy the trained machine learning model in a vehicle control system of a vehicle; and control, via the vehicle control system of the vehicle, a trajectory of the vehicle in response to predicting, using the trained machine learning model, a movement trajectory of the one or more other objects in the driving environment.

14. The non-transitory computer-readable medium of claim 13, wherein the computer-readable instructions, when executed by the processing circuitry, further cause the computing device to:

compute the continuous time movement trajectory of the object over a time period from (i) the starting discrete time period of the discrete time movement trajectory of the object, and (ii) an ending discrete time period of the discrete time movement trajectory of the object.

15. The non-transitory computer-readable medium of claim 13, wherein the vehicle control system comprises a safety system of the vehicle, and wherein the computer-readable instructions, when executed by the processing circuitry, further cause the computing device to perform, via the safety system of the vehicle, a vehicle-based function in response to predicting, at inference, the continuous time movement trajectory of the one or more objects in the acquired image frames when navigating the driving environment.

16. The non-transitory computer-readable medium of claim 13, wherein the computer-readable instructions, when executed by the processing circuitry, further cause the computing device to:

compute the first rigid-body transform dataset by executing an Iterative Closest Point (ICP) algorithm on each respective pair of temporal point cloud data sample sets to identify, via a convergence of the ICP algorithm, the mapping of 3D coordinates between each respective pair of temporal point cloud data sample sets.

17. The non-transitory computer-readable medium of claim 16, wherein:

the object in 3D space comprises a vehicle, and the ICP algorithm comprises a point-to-plane ICP algorithm.

18. The non-transitory computer-readable medium of claim 16, wherein the computer-readable instructions, when executed by the processing circuitry, further cause the computing device to compute the first rigid-body transform dataset by reducing a number of data samples from among each respective pair of temporal point cloud data sample sets used for computing, for each respective pair of temporal point cloud data sample sets, a respective rigid-body transform.

19. The non-transitory computer-readable medium of claim 18, wherein the computer-readable instructions, when executed by the processing circuitry, further cause the computing device to reduce the number of data samples used for computing, for each respective pair of temporal point cloud data sample sets, a respective rigid-body transform by performing a filtering operation that removes outlier data samples by discarding data samples from among each respective pair of temporal point cloud data sample sets that do not share a common 3D region with one another.

20. The non-transitory computer-readable medium of claim 16, wherein the computer-readable instructions, when executed by the processing circuitry, further cause the computing device to reduce a number of data samples used for computing, for each respective pair of temporal point cloud data sample sets, a respective rigid-body transform by performing a filtering operation that removes outlier data samples by using only the data samples from among each respective pair of temporal point cloud data sample sets that, when used for one or more ICP iterations of the ICP algorithm, result in an error value that is less than a threshold error value.

21. The non-transitory computer-readable medium of claim 13, wherein the computer-readable instructions, when executed by the processing circuitry, further cause the computing device to perform the pose graph optimization by minimizing a sum of errors resulting from mapping the 3D coordinates between the first one of the plurality of temporal point cloud data sample sets and each of the plurality of temporal point cloud data sample sets identified with the other respective discrete time periods within the discrete time movement trajectory of the object.

22. The non-transitory computer-readable medium of claim 13, wherein the computer-readable instructions, when executed by the processing circuitry, cause the computing device to control, via the vehicle control system of the vehicle, the trajectory of the vehicle to attempt to avoid a potential collision with the one or more other objects.

* * * * *